United States Patent
Kawamura

(10) Patent No.: US 9,547,568 B2
(45) Date of Patent: Jan. 17, 2017

(54) METHOD AND APPARATUS FOR VERIFYING CIRCUIT DESIGN

(71) Applicant: SOCIONEXT INC., Yokohama-shi, Kanagawa (JP)

(72) Inventor: Taku Kawamura, Arakawa (JP)

(73) Assignee: SOCIONEXT INC., Kanagawa (JP)

(*) Notice: Subject to any disclaimer, the term of this patent is extended or adjusted under 35 U.S.C. 154(b) by 491 days.

(21) Appl. No.: 14/134,435

(22) Filed: Dec. 19, 2013

(65) Prior Publication Data

US 2014/0214355 A1    Jul. 31, 2014

(30) Foreign Application Priority Data

Jan. 31, 2013 (JP) ................ 2013-016352

(51) Int. Cl.
*G06F 11/22* (2006.01)
*G06F 13/42* (2006.01)

(52) U.S. Cl.
CPC ........... *G06F 11/221* (2013.01); *G06F 13/42* (2013.01)

(58) Field of Classification Search
CPC ...... G06Q 20/02; G06Q 20/102; G06Q 20/12; G06Q 20/24; G06Q 40/025; G06Q 20/20; G06Q 20/06; G06Q 20/3223; G06Q 20/3224; G06Q 20/3226; G06Q 20/3278; G06Q 20/353; G06Q 20/36; G06F 1/12; G06F 2201/85; G06F 3/0412; G06F 11/073; G06F 11/0757; G06F 11/0775; G06F 11/0787; G06F 11/079; G06F 11/1451; G06F 11/1464; G06F 11/1471; G06F 11/1474; G06F 11/2069
See application file for complete search history.

(56) References Cited

U.S. PATENT DOCUMENTS

2010/0161305 A1* 6/2010 Hotta .................. G06F 17/5022
                                                                    703/17
2010/0293313 A1* 11/2010 Ferringer ............... G06N 3/086
                                                                    710/110

FOREIGN PATENT DOCUMENTS

| JP | 60-63642  | 4/1985  |
| JP | 63-276660 | 11/1988 |
| JP | 4-148461  | 5/1992  |
| JP | 4-184557  | 7/1992  |

(Continued)

OTHER PUBLICATIONS

Patent Abstracts of Japan, Publication No. 60-63642, Published Apr. 12, 1985.

(Continued)

*Primary Examiner* — Roy Y Yi
(74) *Attorney, Agent, or Firm* — Staas & Halsey LLP

(57) ABSTRACT

A verification test is performed on a device containing master and slave units connected via a bus. In the verification test, a first signal is transferred between a first master unit and a first slave unit during a first transfer period while a second signal is transferred between a second master unit and a second slave unit during a second transfer period. The second transfer period overlaps at least a part of the first transfer period. When the first transfer period is longer than a third transfer period, first combination information indicating the combination of the first master unit and first slave unit is stored in a storage unit, in conjunction with second combination information indicating the combination of the second master unit and second slave unit.

17 Claims, 28 Drawing Sheets

(56) References Cited

FOREIGN PATENT DOCUMENTS

JP        6-149762     5/1994
JP      2010-244300   10/2010

OTHER PUBLICATIONS

Patent Abstracts of Japan, Publication No. 63-276660, Published Nov. 14, 1988.
Patent Abstracts of Japan, Publication No. 4-148461, Published May 21, 1992.
Patent Abstracts of Japan, Publication No. 4-184557, Published Jul. 1, 1992.
Patent Abstracts of Japan, Publication No. 6-149762, Published May 31, 1994.
Patent Abstracts of Japan, Publication No. 2010-244300, Published Oct. 28, 2010.

* cited by examiner

FIG. 8

33 — LEVEL 3

| BURST TRANSFER MODE | BURST SIZE (BYTE) | BURST LENGTH (TRANSFER) | | | | | | | | | | | | | | | |
|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 |
| FIXED | 1 | O | O | O | O | O | O | O | O | O | O | O | O | O | O | O | O |
| | 2 | O | O | O | O | O | O | O | O | O | O | O | O | O | O | O | O |
| | 4 | O | O | O | O | O | O | O | O | O | O | O | O | O | O | O | O |
| | 8 | O | O | O | O | O | O | O | O | O | O | O | O | O | O | O | O |
| INCR | 1 | O | O | O | O | O | O | O | O | O | O | O | O | O | O | O | O |
| | 2 | O | O | O | O | O | O | O | O | O | O | O | O | O | O | O | O |
| | 4 | O | O | O | O | O | O | O | O | O | O | O | O | O | O | O | O |
| | 8 | O | O | O | O | O | O | O | O | O | O | O | O | O | O | O | O |
| WRAP | 1 | - | O | - | O | - | - | - | O | - | - | - | - | - | - | - | O |
| | 2 | - | O | - | O | - | - | - | O | - | - | - | - | - | - | - | O |
| | 4 | - | O | - | O | - | - | - | O | - | - | - | - | - | - | - | O |
| | 8 | - | O | - | O | - | - | - | O | - | - | - | - | - | - | - | O |

FIG. 14

| | | | SHORTEST BUSY PERIOD |
|---|---|---|---|
| M1 | S1 | WRITE ADDRESS CH | |
| | | READ ADDRESS CH | |
| | | WRITE RESPONSE CH | |
| | S2 | WRITE ADDRESS CH | |
| | | READ ADDRESS CH | |
| | | WRITE RESPONSE CH | |
| | S3 | WRITE ADDRESS CH | |
| | | READ ADDRESS CH | |
| | | WRITE RESPONSE CH | |
| M2 | ⋮ | | ⋮ |

| | | | | SHORTEST BUSY PERIOD | | | |
|---|---|---|---|---|---|---|---|
| | | | | 1 TRANSFER | 2 TRANSFERS | 3 TRANSFERS | 4 TRANSFERS |
| M1 | S1 | WRITE DATA CHANNEL | FIXED 1 | | | | |
| | | | 2 | | | | |
| | | | 4 | | | | |
| | | | 8 | | | | |
| | | | INCR 1 | | | | |
| | | | 2 | | | | |
| | | | 4 | | | | |
| | | | 8 | | | | |
| | | | WRAP 1 | - | | - | |
| | | | 2 | - | | - | |
| | | | 4 | - | | - | |
| | | | 8 | - | | - | |
| | | READ DATA CHANNEL | FIXED 1 | | | | |
| | | | 2 | | | | |
| | | | 4 | | | | |
| | | | 8 | | | | |
| | | | INCR 1 | | | | |
| | | | 2 | | | | |
| | | | 4 | | | | |
| | | | 8 | | | | |
| | | | WRAP 1 | - | | - | |
| | | | 2 | - | | - | |
| | | | 4 | - | | - | |
| | | | 8 | - | | - | |
| | S2 | ⋮ | | | ⋮ | | |

| | | | DATA TYPE | BUSY PERIOD | CONFLICT-SUSPECTED CHANNEL |
|---|---|---|---|---|---|
| M1 | S1 | WRITE ADDRESS CH | - | | |
| | | READ ADDRESS CH | - | | |
| | | WRITE RESPONSE CH | - | | |
| | | WRITE DATA CH | | | |
| | | READ DATA CH | | | |
| | S2 | WRITE ADDRESS CH | - | | |
| | | READ ADDRESS CH | - | | |
| | | WRITE RESPONSE CH | - | | |
| | | WRITE DATA CH | | | |
| | | READ DATA CH | | | |
| | S3 | WRITE ADDRESS CH | - | | |
| | | READ ADDRESS CH | - | | |
| | | WRITE RESPONSE CH | - | | |
| | | WRITE DATA CH | | | |
| | | READ DATA CH | | | |
| M2 | S1 | WRITE ADDRESS CH | - | | |
| | | READ ADDRESS CH | - | | |
| | | WRITE RESPONSE CH | - | | |
| | | WRITE DATA CH | | | |
| | | READ DATA CH | | | |
| | S2 | WRITE ADDRESS CH | - | | |
| | | READ ADDRESS CH | - | | |
| | | WRITE RESPONSE CH | - | | |
| | | WRITE DATA CH | | | |
| | | READ DATA CH | | | |

METHOD AND APPARATUS FOR VERIFYING CIRCUIT DESIGN

CROSS-REFERENCE TO RELATED APPLICATION

This application is based upon and claims the benefit of priority of the prior Japanese Patent Application No. 2013-016352, filed on Jan. 31, 2013, the entire contents of which are incorporated herein by reference.

FIELD

The embodiments discussed herein relate to a method and apparatus for verifying a circuit design.

BACKGROUND

As an architecture of integrated circuits such as large-scale integration (LSI) devices, some known devices contain a plurality of master units and plurality of slave units that are connected together via a bus. Designing a circuit based on a given specification and verifying the design are part of a typical development process of integrated circuits. A circuit design may be verified in various aspects, one of which is a conflict verification that tests whether the circuit operates properly in possible conflict conditions of signals transferred through a bus. This test is achieved by causing the device under test to transfer signals between master units and slave units in various combinations.

There are several existing techniques for testing conflict in a multiprocessor system. One such technique keeps track of bus request signals from a plurality of processors to monitor how they use a common bus in the system. Another technique is to check the occurrence of conflict by using processing requests from processors. Yet another existing technique provides a conflict-prone environment by generating a pseudo request that conflicts with a real request from a processor. See, for example, the following documents:

Japanese Laid-open Patent Publication No. 63-276660
Japanese Laid-open Patent Publication No. 60-063642
Japanese Laid-open Patent Publication No. 04-184557

Test patterns (or scenarios) are designed to achieve conflict verification. In the case of an integrated circuit containing master and slave units and their bus connection, the test patterns activate two or more combinations of master and slave units in parallel, thereby producing conflict-causing conditions.

The conventional conflict verification techniques, however, only provide insufficient information about the test coverage, i.e., how thoroughly the verification test generates possible conflict conditions in the integrated circuit under test. In other words, the conventional techniques may overlook some possible conflict conditions or may needlessly repeat the same test.

SUMMARY

According to an aspect of the embodiments to be discussed herein, there is provided a computer-readable storage medium storing a program for verification. This program causes a computer to perform a procedure including: obtaining a first transfer period of a first signal transferred between a first master unit and a first slave unit, the first master unit being among a plurality of master units included in a device to be tested, the first slave unit being among a plurality of slave units included in the device to be tested, the plurality of master units and the plurality of slave units being connected to a bus included in the device to be tested; producing second combination information indicating a combination of a second master unit and a second slave unit, the second master unit being among the plurality of master units, the second slave unit being among the plurality of slave units, a second signal being transferred between the second master unit and the second slave unit during a second transfer period that overlaps at least a part of the first transfer period; comparing the first transfer period with a third transfer period in terms of time length; and storing first combination information indicating a combination of the first master unit and the first slave unit in conjunction with the produced second combination information in a storage unit when the first transfer period is longer than the third transfer period.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 8 depicts an example of a coverage table for level 3;
FIGS. 14 and 15 are first and second diagrams illustrating an example of databases used.

DESCRIPTION OF EMBODIMENTS

The description begins with explanation of what kind of conflict may be encountered in a device under test.

Figure 1:
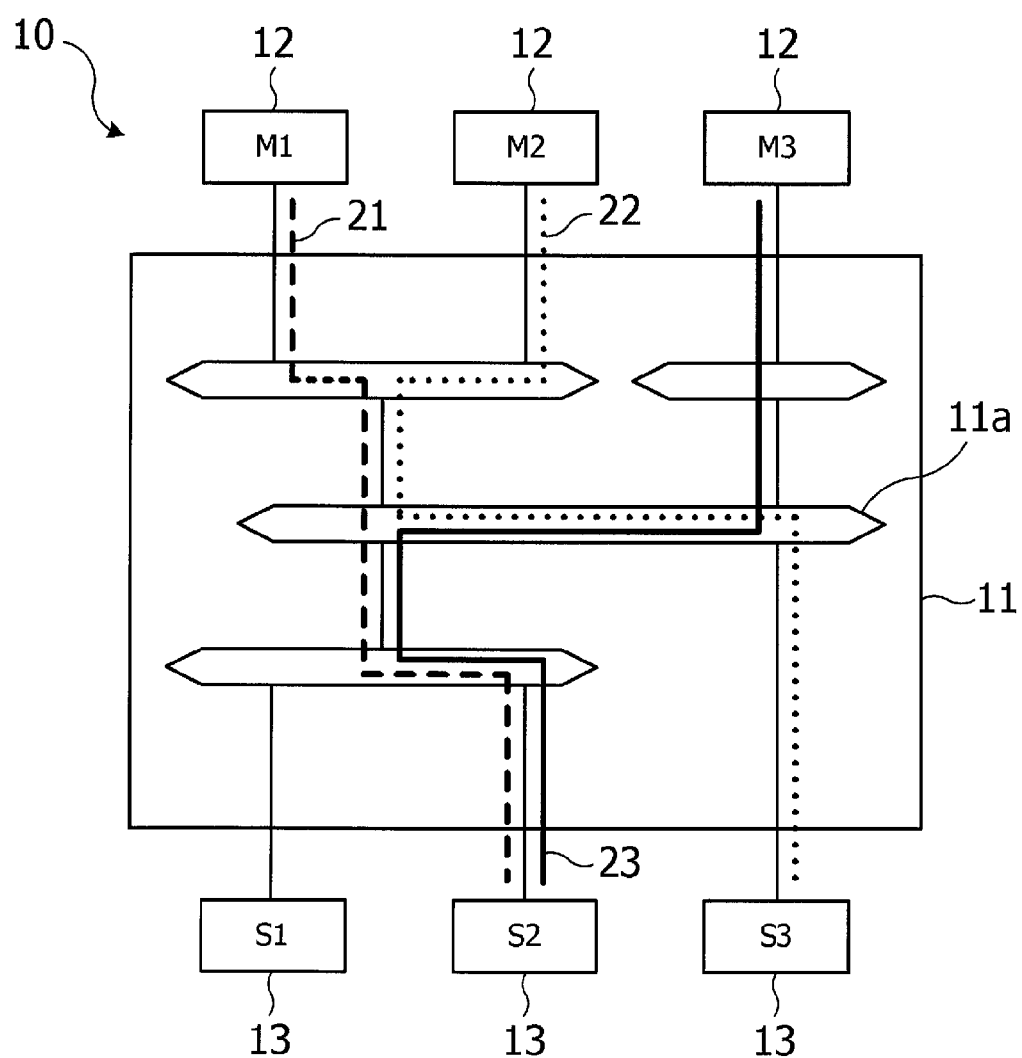
FIGS. 1 and 2 are first and second diagrams illustrating an example of a device under test.
Figure 2:
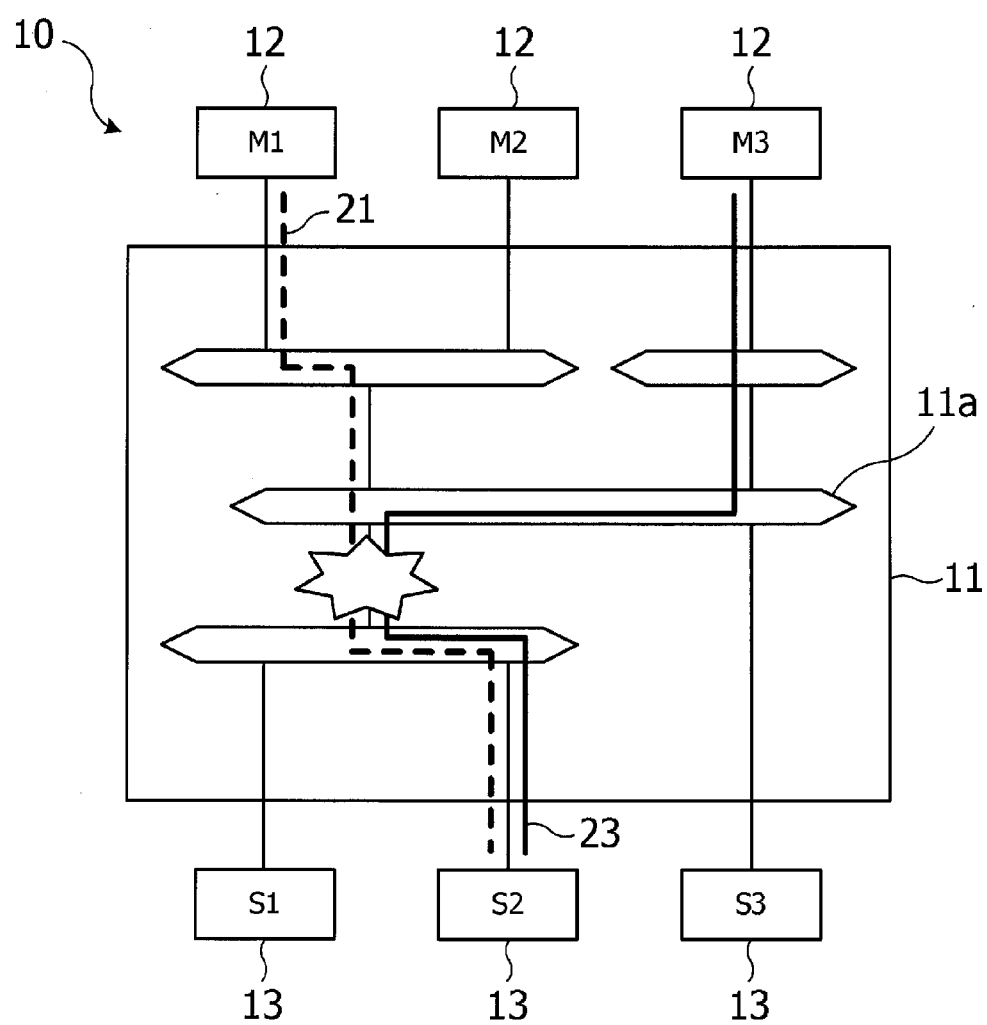

FIGS. 1 and 2 schematically illustrate an example of a device to be verified with the techniques described below. Specifically, FIGS. 1 and 2 depict several internal transport paths for transferring signals.

Referring to FIG. 1, the illustrated device under test (DUT) 10 includes a bus 11 and a plurality of master units 12 and slave units 13 each connected to the bus 11. The DUT 10 may be, for example, an integrated circuit whose logic design is defined in a register transfer level (RTL) model. More specifically, FIG. 1 illustrates three master units 12, named M1, M2, and M3, and three slave units 13, named S1, S2, and S3.

The master units 12 may be, for example, a central processing unit (CPU), graphics processing unit (GPU), direct memory access controller (DMAC), or their combinations. These devices are capable of issuing commands to the bus 11 at their own discretion. The slave units 13 may be static random-access memory (SRAM), synchronous dynamic random access memory (SDRAM), or other kind of memory devices. These devices receive a command from master units 12 via the bus 11 and return a response to them.

The bus 11 includes one, two, or more switches 11a via which the master units 12 can be connected to the slave units 13 in various combinations. For example, the DUT 10 seen in FIG. 1 contains four such switches 11a. Specifically, the broken line in FIG. 1 indicates a transport path 21 inside the bus 11, which permits one master unit M1 to reach one slave unit S2. Similarly, the dotted line indicates another transport path 22 inside the bus 11, which permits another master unit M2 to reach another slave unit S3. The bold solid line indicates yet another transport path 23 inside the bus 11, which permits yet another master unit M3 to reach the slave unit S2.

One potential issue of the above-described DUT 10 is that the signals on two overlapping paths may conflict with each other when they happen to be used at the same time. For example, the aforementioned transport path 21 between master unit M1 and slave unit S2 in FIG. 2 overlaps in part with another transport path 23 running between master unit M3 and slave unit S2. A problem could arise if there is an overlap in the transfer period of signals on these transport paths 21 and 23.

The DUT 10 is thus subjected to a conflict verification test. For example, the verification apparatus makes the master units 12 and slave units 13 operate in accordance with predetermined scenarios (test patterns), so that they will operate concurrently in various master-slave combinations. That is, the DUT 10 is tested under as many conflict-prone conditions as possible, with a variety of combinations of signals that may be produced during its operation. It would be difficult, however, to evaluate the test coverage of this verification process without clear definition of the conflict that the verification apparatus is supposed to detect. For example, a particular conflict pattern may be applied multiple times to the same combination of master and slave units 12 and 13, or the verification test may finish without producing some particular conflict conditions.

In view of the above, the proposed verification method and apparatus use several techniques described below to test the DUT 10 in terms of conflict verification. First discussed in this section is the definition of conflict. Specifically, the presence of a conflict is determined with reference to the shortest transfer period of signals transferred between a particular combination of a master unit 12 and a slave unit 13. Here the term "shortest transfer period" refers to the duration of signal transfer that is performed between a master unit 12 and a slave unit 13 without being affected by any other signals. Suppose, for example, that the master unit 12 and slave unit 13 have consumed some time to transfer their signal over a specific transport path. If the consumed time is longer than the noted duration, or the shortest transfer period, it means that a conflict has occurred at some part of the transport path between the master unit 12 and slave unit 13.

The term "transfer period" denotes the time from transmission of a specific signal at the source master unit 12 to reception of the signal at the destination slave unit 13. This term is also used for signals transferred in the other way around, i.e., from slave unit 13 to master unit 12. Where appropriate, another term "busy period" may be used below as a synonym of transfer period.

Referring now to the example of FIG. 2, the busy period of a transport path 21 is an extent of time for a signal to be transferred between master unit M1 and slave unit S2. The duration of this signal transfer becomes minimum when there is no influence of other signals, which is thus referred to as the "shortest busy period." When an observed busy period of master unit M1 and slave unit S2 is longer than the shortest busy period, it indicates that a conflict has occurred on their transport path 21.

Conflicts may be classified into three types as follows. (a) The first type of conflict occurs when a plurality of master units 12 make access to a single slave unit 13. This conflict is referred to as an "inter-master conflict." (b) The second type of conflict occurs when a single master unit 12 makes access to a plurality of slave units 13. This conflict is referred to as an "inter-slave conflict." (c) The third type of conflict occurs when a plurality of master units 12 make access to different slave units 13. This conflict is referred to as an "intra-bus conflict." The next section will elaborate on each of these three conflicts with reference to FIGS. 3 to 5.

Figure 3:
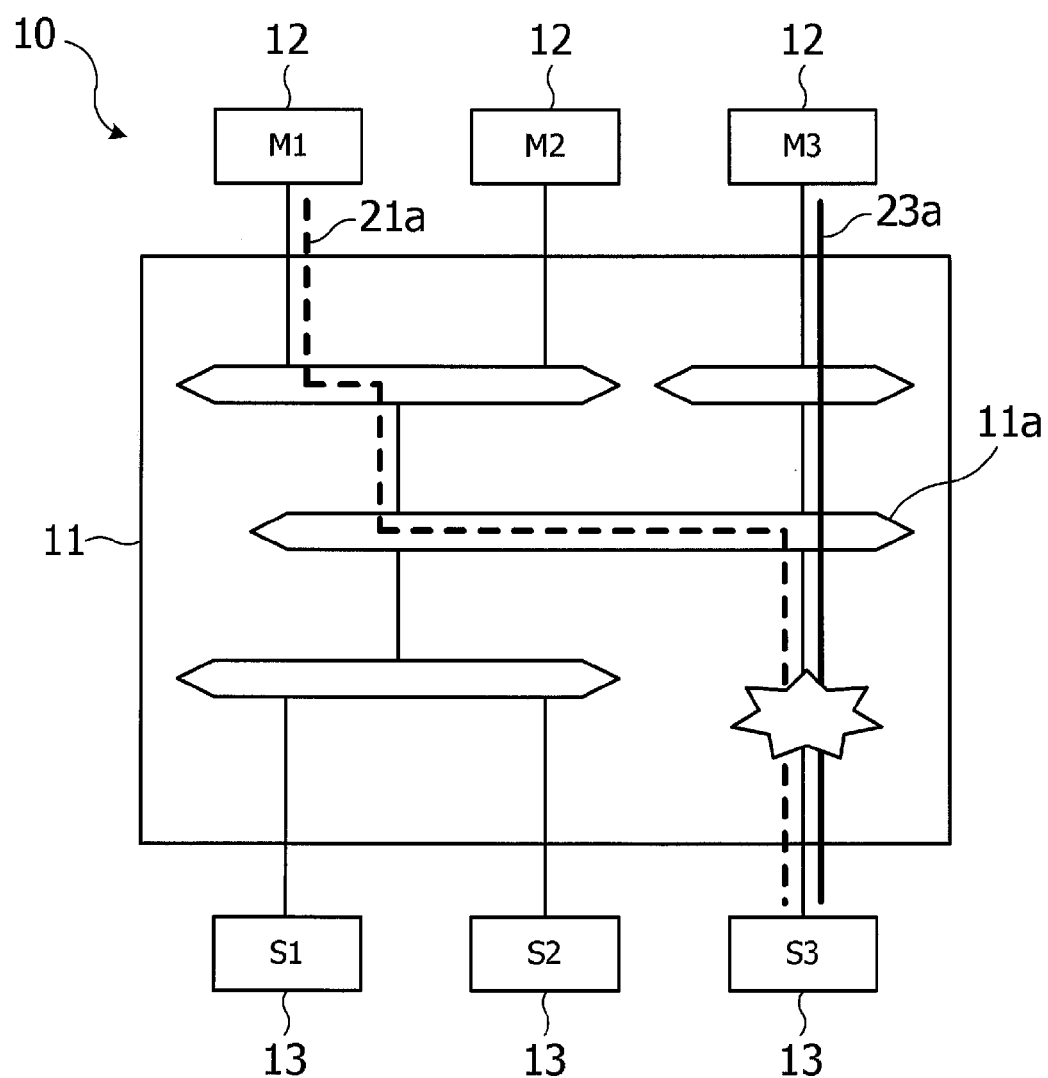
FIG. 3 illustrates an example of inter-master conflict.

FIG. 3 illustrates an example of inter-master conflict. As seen in FIG. 3, two different master units M1 and M3 are attempting access to one slave unit S3. This situation actually happens when, for example, a CPU and a DMAC (as master units M1 and M3) write data to a memory device (as slave unit S3) at the same time.

Here, one master unit M1 reaches a slave unit S3 via a transport path 21a, while another master unit M3 does the same via a transport path 23a. The busy period of the former transport path 21a may become longer than its shortest busy period due to some influence of the signal transfer over the latter transport path 23a. When this is the case, the former transport path 21a is deemed to be experiencing a conflict. On the other hand, the busy period of the latter transport path 23a may become longer than its shortest busy period due to some influence of the signal transfer over the former transport path 21a. In this case, the latter transport path 23a is deemed to be experiencing a conflict.

Figure 4:
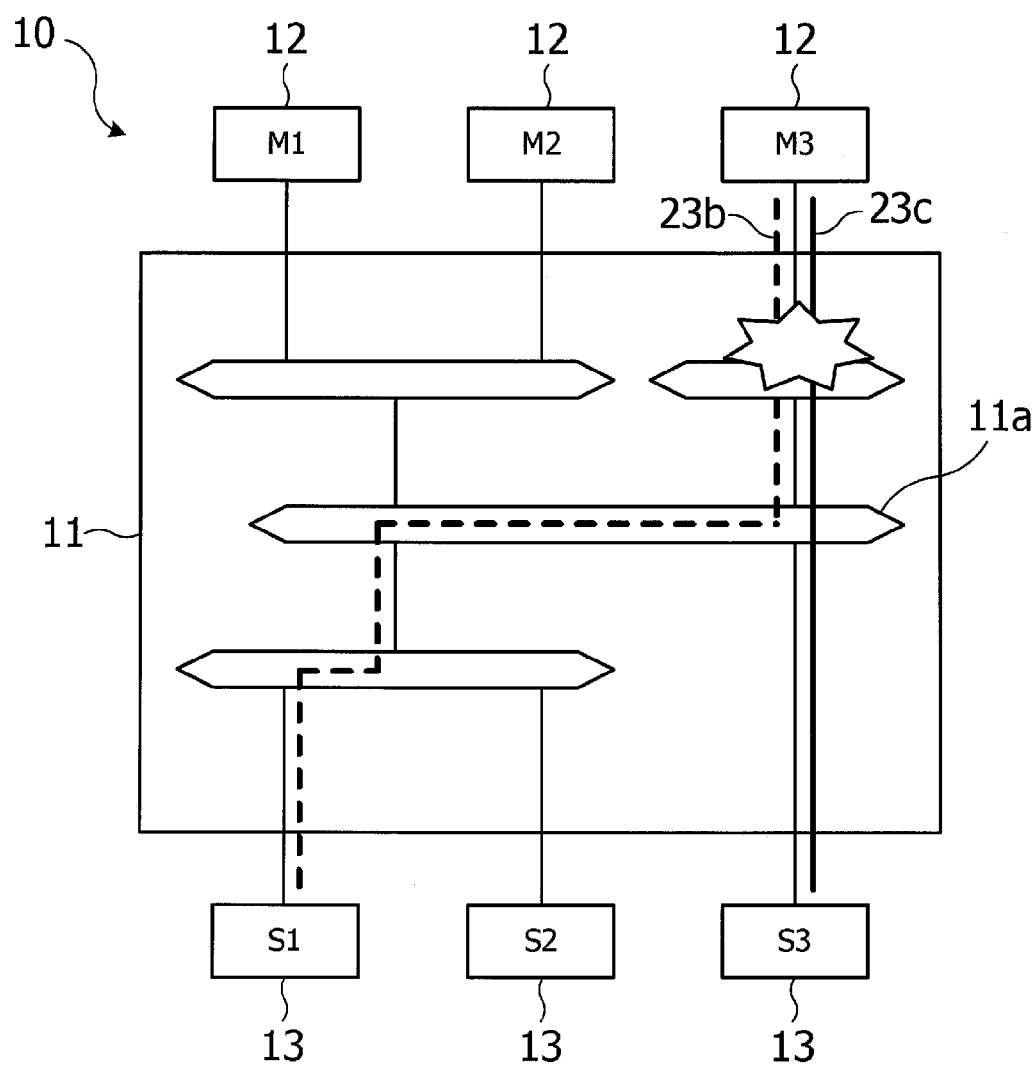
FIG. 4 illustrates an example of inter-slave conflict.

FIG. 4 illustrates an example of inter-slave conflict. As seen in FIG. 4, one master unit M3 is attempting access to two different slave units S1 and S3. This situation actually happens when, for example, a CPU or DMAC (as master unit M3) reads data out of two memory devices (as slave units S1 and S3) at the same time.

Here, the master unit M1 reaches a slave unit S1 via a transport path 23b, as well as another slave unit S3 via a transport path 23c. The busy period of the former transport path 23b may become longer than its shortest busy period due to some influence of the signal transfer over the latter transport path 23c. When this is the case, the former transport path 23b is deemed to be experiencing a conflict. On the other hand, the busy period of the latter transport path 23c may become longer than its shortest busy period due to some influence of the signal transfer over the former transport path 23b. In this case, the latter transport path 23c is deemed to be experiencing a conflict.

Figure 5:
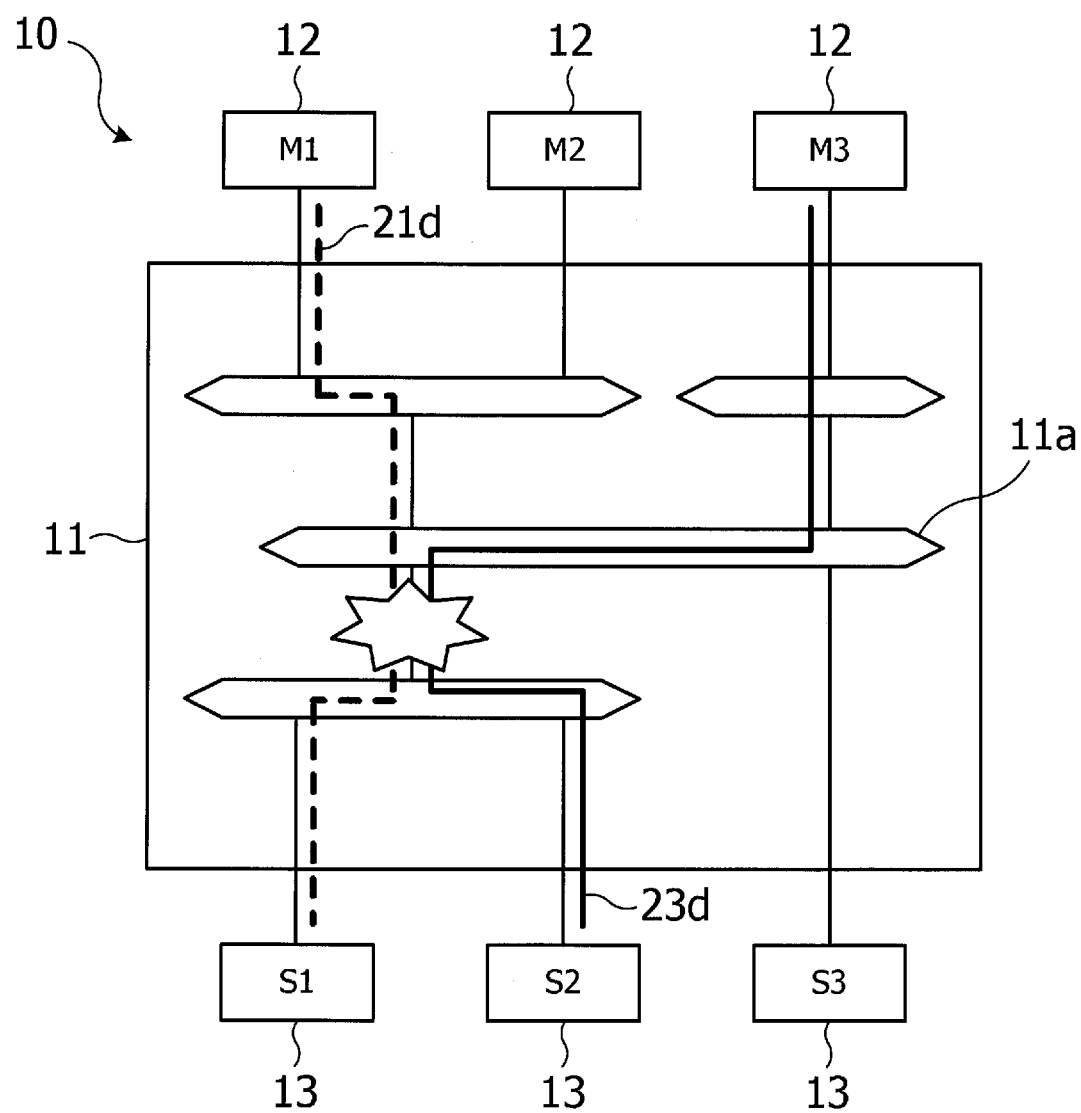
FIG. 5 illustrates an example of intra-bus conflict.

FIG. 5 illustrates an example of intra-bus conflict. As seen in FIG. 5, two different master units M1 and M3 are attempting access to two different slave units S1 and S2, respectively.

Here, one master unit M1 reaches one slave unit S1 via a transport path 21d, while another master unit M3 reaches another slave unit S2 via a transport path 23d. The busy period of the former transport path 21d may become longer than its shortest busy period due to some influence of the signal transfer operation on the latter transport path 23d. When this is the case, the former transport path 21d is deemed to be experiencing a conflict. On the other hand, the busy period of the latter transport path 23d may become longer than its shortest busy period due to some influence of the signal transfer operation on the former transport path 21d. In this case, the latter transport path 23d is deemed to be experiencing a conflict.

Again, the DUT 10 in the present example includes a plurality of master units 12 (M1, M2, M3) and a plurality of slave units 13 (S1, S2, S3) connected via a bus 11. Possible conflicts in this DUT 10 fall into either of the three types discussed above in FIGS. 3 to 5.

The proposed verification apparatus includes a recording unit configured to record information indicating every conflict that has been tested in the DUT 10. Each piece of conflict information corresponds to a set of master units 12 and slave units 13 involved in a particular conflict. For example, the recording unit stores a coverage table seen in FIG. 6. As will be described below, this coverage table stores information indicating each combination of master units 12 and slave units 13 that have experienced a conflict.

Figure 6:
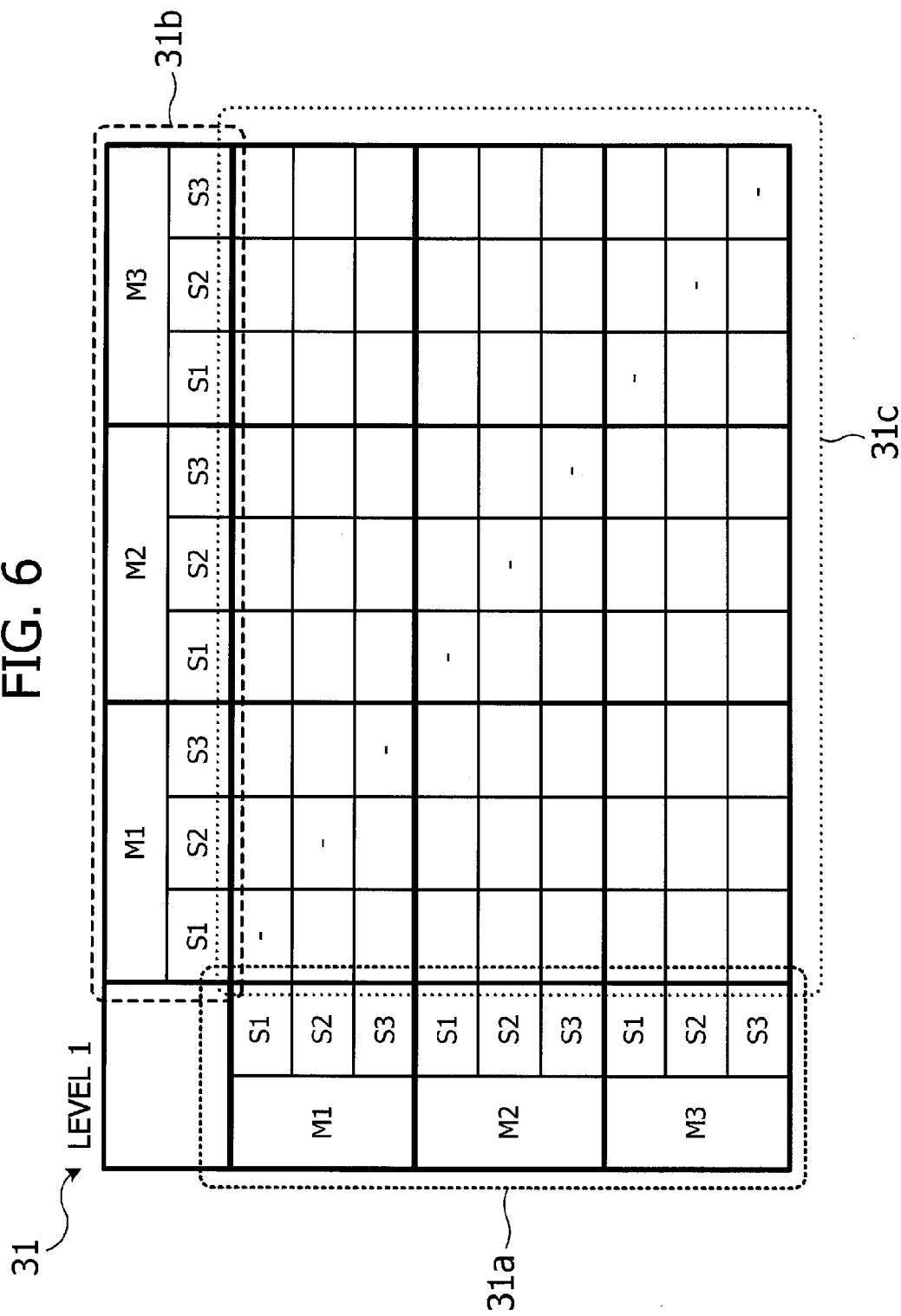
FIG. 6 depicts an example of a coverage table for level 1.

FIG. 6 depicts an example of a coverage table for level 1. The illustrated level-1 coverage table 31 of FIG. 6 arranges information in rows 31a and columns 31b. The rows 31a represent various combinations of a master unit 12 and a slave unit 13 of interest, and the columns 31b represent those that may conflict with the former ones.

Take the combination of master unit M1 and slave unit S1 (referred to herein as "M1-S1"), for example. This master-slave combination M1-S1 may conflict with other master-slave combinations M1-S2, M1-S3, M2-S1, M2-S2, M2-S3, M3-S1, M3-S2, and M3-S3. Of all those combinations, two combinations M1-S2 and M1-S3 share the same master unit M1 with the combination M1-S1 of interest. These combinations M1-S2 and M1-S3 are subject to the inter-slave conflict discussed above in FIG. 4. Another two combinations M2-S1 and M3-S1 share the same slave unit S1 with the combination M1-S1 of interest, whereas their master units are different. These combinations M2-S1 and M3-S1 are subject to the inter-master conflict discussed above in FIG. 3. In contrast, the remaining combinations M2-S2, M2-S3, M3-S2, and M3-S3 have no commonality with the combination M1-S1 of interest. These combinations M2-S2, M2-S3, M3-S2, and M3-S3 are subject to the intra-bus conflict discussed above in FIG. 5. Note that the coverage table 31 has a cell whose row and column are both corresponding to the combination M1-S1 of interest. This cell contains no meaningful information because the combination M1-S1 does not conflict with itself. Accordingly, a special symbol "-" is placed in such cells of the coverage table 31 in FIG. 6.

The above description of M1-S1 may similarly apply to other various combinations of master and slave units 12 and 13. These master-slave combinations may similarly experience either of the foregoing inter-master conflict, inter-slave conflict, and intra-bus conflict.

During the process of conflict verification of the DUT 10, the cells 31c in the level-1 coverage table 31 of FIG. 6 are populated with information that indicates which conflict-causing master-slave combinations (in columns 31b) have been tested in conjunction with each master-slave combination of interest (in rows 31a). This feature of the coverage table 31 enables evaluation of how thoroughly the verification test covers possible conflicts. That is, the design engineer can see at a glance which master-slave combinations, of all those in the DUT 10, have been tested in the conflict scenarios. If all cells 31c in the coverage table 31 (except for the ones corresponding to the same master-slave pairs) are populated, then it means that the verification test has covered every possible conflict that may happen in the DUT 10.

The aforementioned recording unit in the verification apparatus may be configured to record, not only the above-described combinations of master units 12 and slave units 13, but also combinations of channels (transport paths of signals) whose conflict have been tested. For example, another level of coverage tables may be used to record information about which combination of channels has been tested by the conflict verification, as will be discussed below in FIG. 7.

Figure 7:
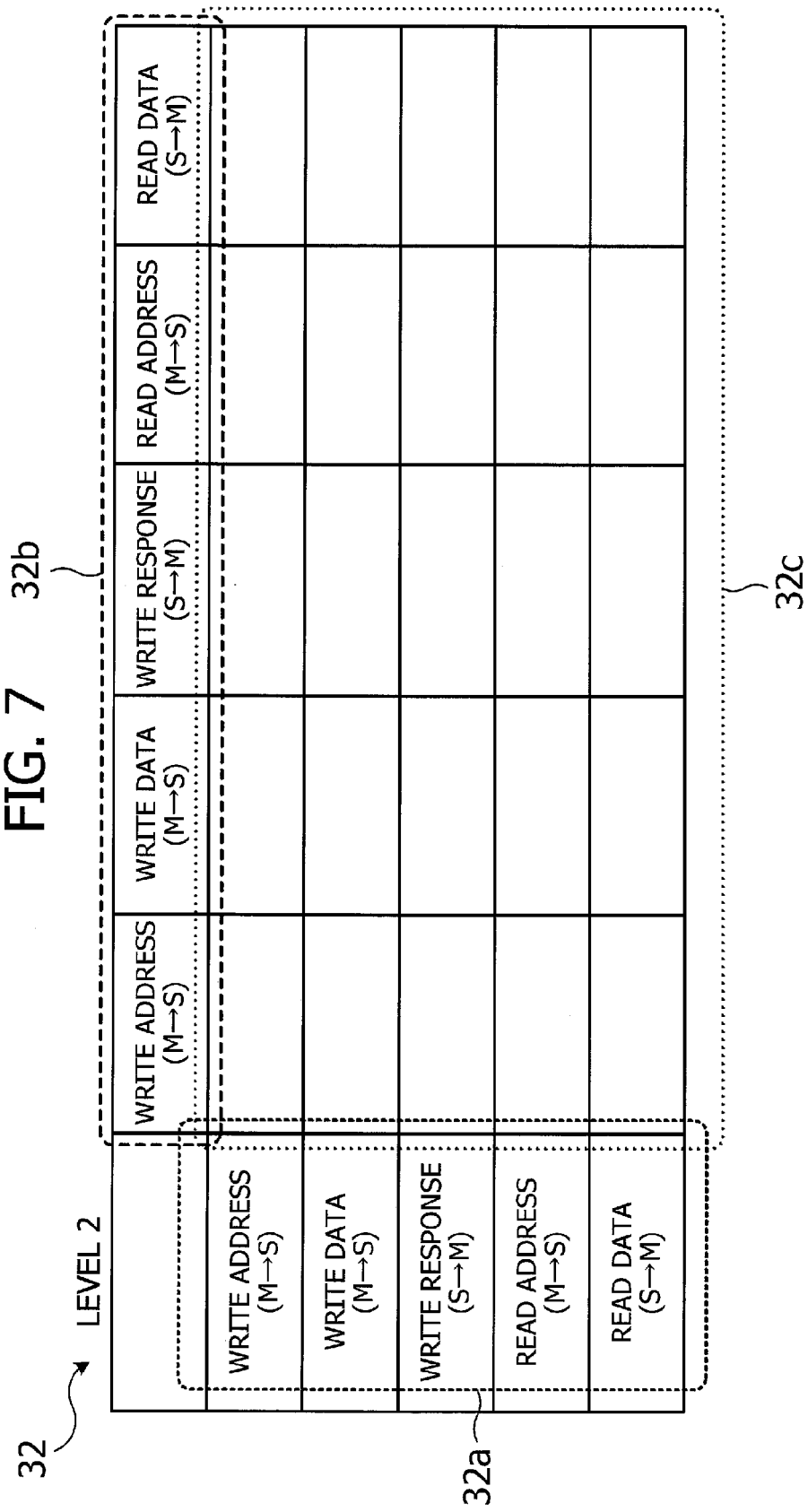
FIG. 7 depicts an example of a coverage table for level 2.

FIG. 7 depicts an example of a coverage table for level 2. The bus 11 may use, for example, the Advanced Extensible Interface (AXI) protocol, in which case the DUT includes five channels named "write address channel," "write data channel," "write response channel," "read address channel," and "read data channel." More specifically, the write address channel transfers a write address from a master unit 12 to a slave unit 13 (M→S). The write data channel transfers write data from a master unit 12 to a slave unit 13 (M→S). The write response channel transfers a write response from a slave unit 13 to a master unit 12 (S→M). The read address channel transfers a read address from a master unit 12 to a slave unit 13 (M→S). The read data channel transfers read data from a slave unit 13 to a master unit 12 (S→M).

Referring to FIG. 7, the illustrated level-2 coverage table 32 arranges information in rows 32a and columns 32b. The rows 32a represent a set of channels for a particular combination of a master unit 12 and a slave unit 13 of interest. The columns 32b, on the other hand, represent a set of channels for another combination of a master unit 12 and a slave unit 13 that may conflict with the combination of interest. A plurality of such level-2 coverage tables 32 are produced, one for each different cell 31c of the level-1 coverage table 31 discussed above in FIG. 6.

During the course of conflict verification, the cells 32c in the level-2 coverage table 32 of FIG. 7 are populated with information indicating which channel of a conflict-causing master-slave combination have been tested in conjunction with a channel of the master-slave combination of interest. If all cells 32c in the coverage table 32 are populated, then it means that the verification process has tested every possible combination of channels of the master-slave combination of interest and those of a conflict-causing master-slave combination. That is, it is possible to see which channels has been tested for a particular master-slave combination of interest and another master-slave combination that causes a conflict, thus permitting the designer to determine how exhaustive the verification process is.

The recording unit in the proposed verification apparatus may be configured to record, not only the foregoing master-slave combinations and their respective channel combinations in the DUT 10, but also information about what kind of data has been transferred by write data channels and read data channels. For example, another level of coverage tables may be used to record information about the type of data transferred by those channels, as will be described below in FIG. 8.

FIG. 8 depicts an example of a coverage table for level 3. In the case where the DUT 10 uses the AXI protocol in its bus 11, the write data and read data transferred over a channel may be classified into a number of distinct types. Specifically, FIG. 8 illustrates three types of burst data transfer, named "FIXED," "INCR," and "WRAP." In a FIXED burst, the address remains constant. In an INCR burst, the address is incremented each time a unit amount of data is transferred. In a WRAP burst, the address is incremented up to a predetermined boundary, at which the address wraps around. Each type of bursts may take a variety of burst sizes and burst lengths. Here the term "burst size" refers to the number of bytes that are transferred in a single operation. Specifically, a burst of data may be transferred one byte at time, two bytes at a time, four bytes at a time, or eight bytes at a time. The term "burst length" refers to the number of data transfer cycles executed to send a single burst of data. The burst length is expressed in units of "transfers." In the case of a FIXED or INCR burst, the burst length may range from 1 (single transfer) to 16 (sixteen transfers). In the case of a WRAP burst, the burst length may be set to 2, 4, 8, or 16.

The above-noted burst types, burst sizes, and burst lengths may be combined in various ways, thus producing as many data types as seen in FIG. 8. Small circles are placed in this level-3 coverage table 33 to indicate valid data type options, while the symbol "-" indicates unusable ones. These data types are applied to write data transfer and read data transfer in the DUT 10.

During the course of conflict verification, the data type of signals transferred by a write data channel or read data channel is recorded for the level-3 coverage table 33 of FIG. 8. If all data types indicated in the level-3 coverage table 33 are recorded for a particular write data channel or read data channel given in a foregoing level-2 coverage table 32 of FIG. 7, it means that the verification process has tested every possible data type that may be handled by the write data channel or read data channel. In other words, the level-3 coverage table 33 makes it possible to see what type of data has been transferred over channels under the conflict-causing conditions, thus permitting the design engineer to determine how exhaustive the verification test is.

The following section will describe more specifics of the proposed verification apparatus and verification process.

As previously noted, the verification apparatus causes a DUT 10 to operate in accordance with predetermined scenarios and monitors resulting conflict in the DUT 10. During this course, the verification apparatus collects and records some predetermined data according to the coverage tables 31 to 33 discussed above. To this end, a conflict monitor may be attached to the DUT 10.

Figure 9:
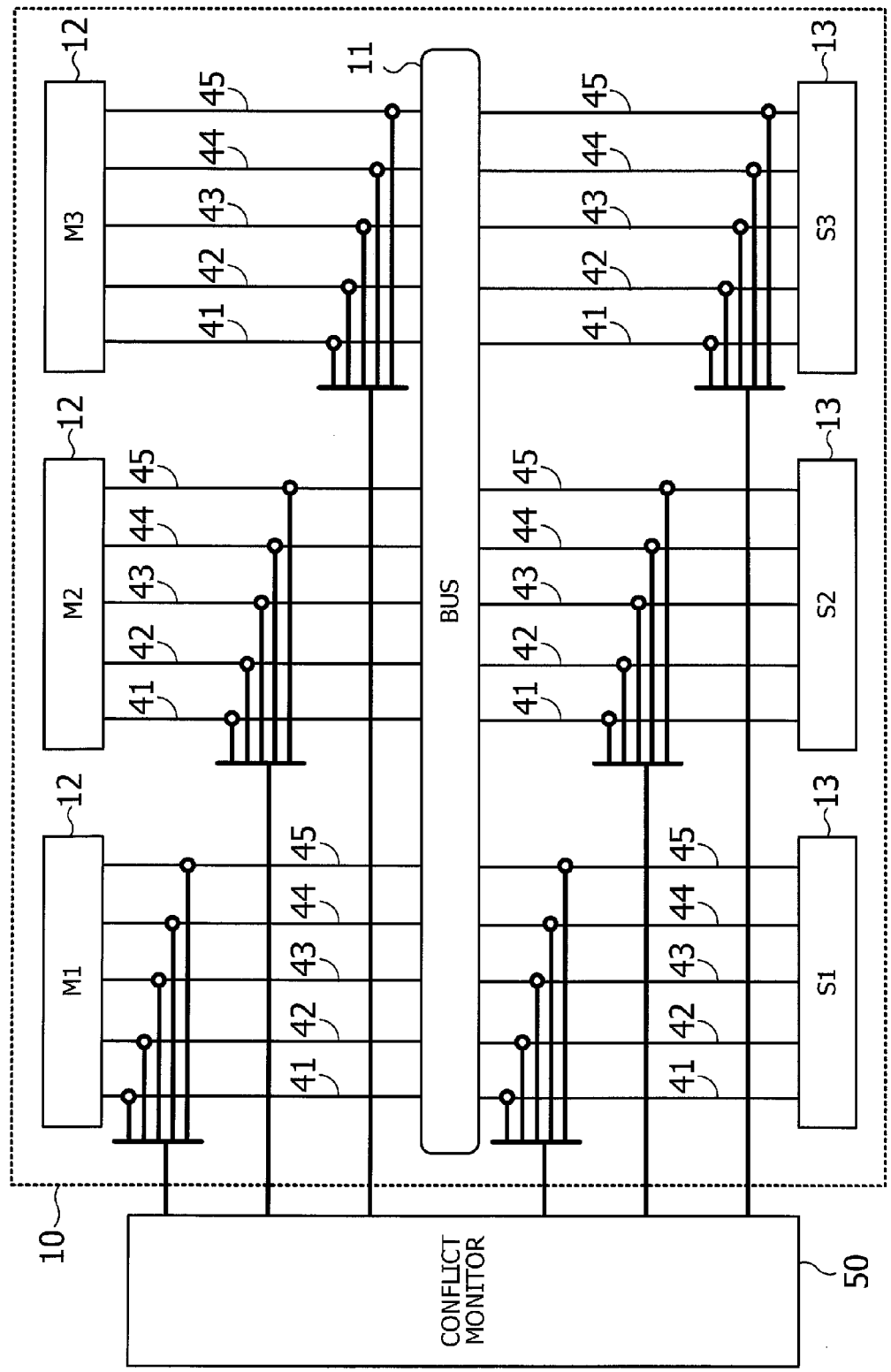
FIG. 9 illustrates an example of how a conflict monitor is attached to the device under test.

FIG. 9 illustrates an example of how a conflict monitor is attached to the DUT 10. As the DUT 10 employs AXI, each of the master units 12 and slave units 13 on the bus 11 has five channels. More specifically, each master unit 12 (M1, M2, M3) has a write address channel 41, write data channel 42, a write response channel 43, a read address channel 44, and a read data channel 45. Similarly, each slave unit 13 (S1, S2, S3) has its own write address channel 41, write data channel 42, write response channel 43, read address channel 44, and read data channel 45. The conflict monitor 50 is attached to these channels 41 to 45 as illustrated in FIG. 9.

The conflict monitor 50 monitors each channel that connects a master unit 12 with a slave unit 13 via the bus 11 so as to collect several kinds of information when it detects transition of the monitored channel from busy state to idle state. What is collected includes information indicating the data type of signals transferred by the channel. Information about the busy period is also included. The conflict monitor 50 further collects information indicating channels that might have conflicted with the transferred signals. These channels are referred to herein as "conflict-suspected channels." The conflict monitor 50 analyzes the collected information about conflict-suspected channels and the like to determine which channels have actually conflicted with the transferred signals of interest. The determined channels are referred to herein as the "conflict-causing channels."

Both the DUT 10 and conflict monitor 50 may be created as RTL models. The DUT 10, coupled with the conflict monitor 50, is subjected to a conflict verification test executed by, for example, a verification apparatus described below with reference to FIG. 10.

Figure 10:
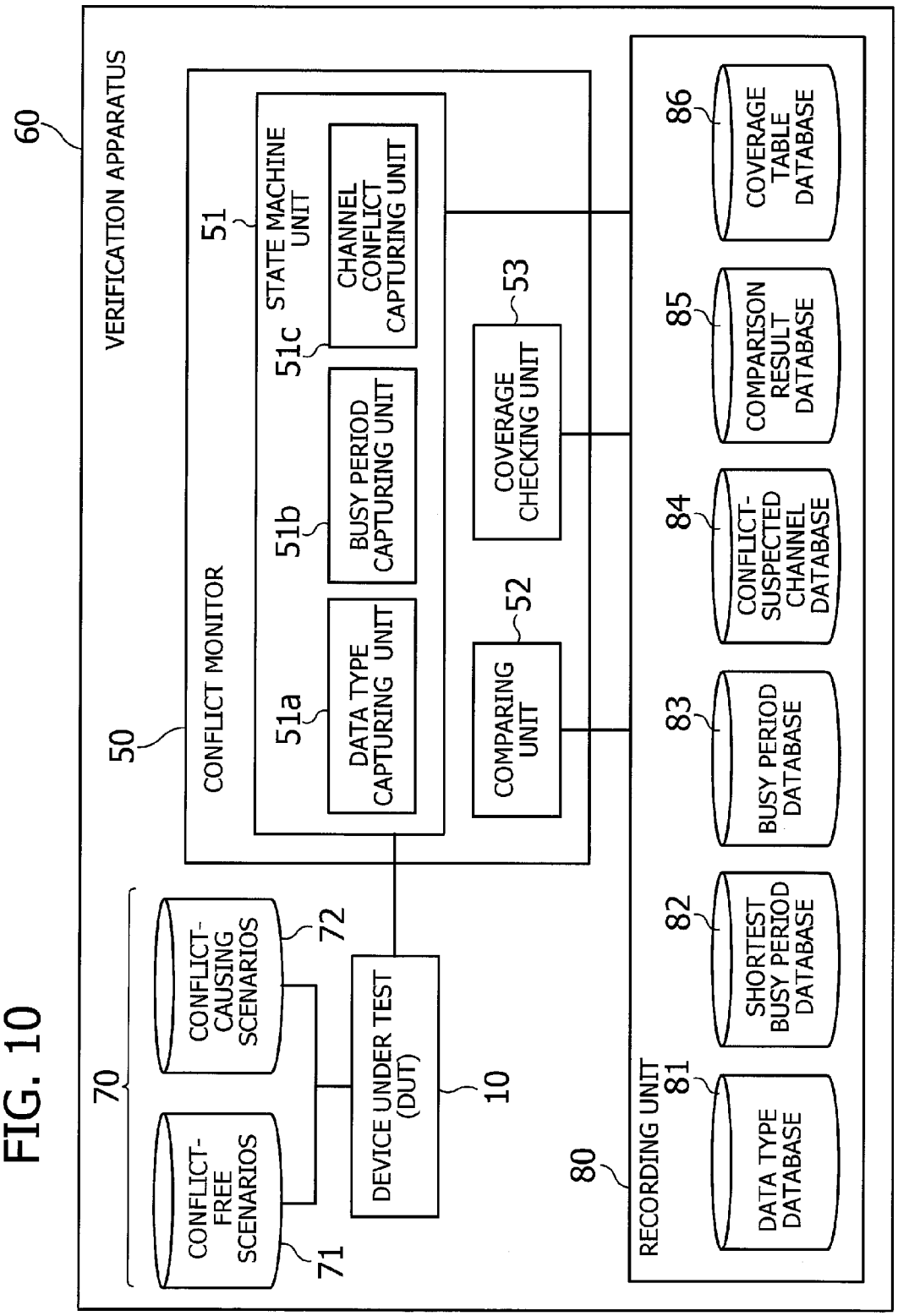
FIG. 10 illustrates an exemplary configuration of a verification apparatus.

FIG. 10 illustrates an exemplary configuration of a verification apparatus. The illustrated verification apparatus 60 includes scenarios 70, a DUT 10, a conflict monitor 50, and a recording unit 80. Scenarios 70 used in this verification apparatus 60 are actually formed from two distinct sets of scenarios 71 and 72. Specifically, conflict-free scenarios 71 cause no conflict in the DUT 10, while conflict-causing scenarios 72 produce conflict in the DUT 10. The verification apparatus 60 makes the DUT 10 to operate in accordance with such scenarios 70, together with a conflict monitor 50 attached thereto in the way discussed above in FIG. 9. The conflict monitor 50 is configured to keep track of each channel that connects particular master and slave units 12 and 13 via the bus 11.

The above-noted conflict-free scenarios 71 are used to permit the conflict monitor 50 to collect information indicating the data type of signals transferred by each channel, as well as information indicating the shortest busy period. It is noted that the conflict-free scenarios 71 are configured to activate a single combination of master and slave units 12 and 13 at a time, so that the conflict monitor 50 can obtain the shortest busy period for that master-slave combination. The conflict-causing scenarios 72, on the other hand, permit the conflict monitor 50 to collect information indicating the data type of signals transferred by each channel, information indicating busy periods of each channel, and information indicating conflict-suspected channels.

Referring to FIG. 10, the conflict monitor 50 includes a state machine unit 51, a comparing unit 52, and a coverage checking unit 53. The state machine unit 51 includes a data type capturing unit 51a, a busy period capturing unit 51b, and a channel conflict capturing unit 51c.

When the DUT 10 is operating with conflict-free scenarios 71, the data type capturing unit 51a collects information indicating the data type of signals transferred by each channel. The data type capturing unit 51a does the same with conflict-causing scenarios 72 as well.

The busy period capturing unit 51b collects information indicating the shortest busy period of each activated channel when the DUT 10 is operating with conflict-free scenarios 71. The busy period capturing unit 51b also collects information indicating busy periods of each activated channel when the DUT 10 is operating with conflict-causing scenarios 72. It is noted that the busy period capturing unit 51b captures such busy periods and shortest busy periods for each individual data type of transferred signals.

The channel conflict capturing unit 51c collects information indicating conflict-suspected channels of a particular channel when the DUT 10 is operating with conflict-causing scenarios 72. Note that the information is collected for each individual data type of transferred signals. More specifically, when a busy period of a particular channel is captured, the channel conflict capturing unit 51c seeks other channels whose busy periods overlap at least partly with the busy period that is captured. If such an overlap is found, the channel having the overlapping busy period is regarded as a conflict-suspected channel of the particular channel of interest.

The comparing unit 52 compares the busy period of each channel with its corresponding shortest busy period, referring to the information collected by the busy period capturing unit 51b. When one channel has a busy period longer than its shortest busy period, the comparing unit 52 determines that its corresponding conflict-suspected channel is the conflict-causing channel of that one channel.

The coverage checking unit 53 generates and stores various information in the recording unit 80. This information includes information about channels having longer busy periods than their respective shortest busy periods, master-slave combinations connected by those channels, the data type of signals transferred by the same, and the channels conflicting with the same.

The recording unit 80 includes a data type database 81, a shortest busy period database 82, a busy period database 83, a conflict-suspected channel database 84, a comparison result database 85, and a coverage table database 86.

The data type database 81 is a collection of information that indicates the data type of transferred signals. The data type capturing unit 51a has collected this information for each different channel.

The shortest busy period database 82 is a collection of information that indicates the shortest busy period of each channel. The busy period capturing unit 51b has collected this information for each different data type.

The busy period database 83 is a collection of information that indicates busy periods of each channel. The busy period capturing unit 51b has collected this information for each different data type.

The conflict-suspected channel database 84 is a collection of information that indicates conflict-suspected channels of each particular channel. The channel conflict capturing unit 51c has collected this information for each different data type.

The comparison result database 85 is a collection of information that indicates the result of comparison that the comparing unit 52 has made between each specific busy period and its relevant shortest busy period. That is, the information represents the channels whose busy periods are longer than their corresponding shortest busy periods.

The coverage table database 86 is a collection of information that corresponds to the level 1 to level-3 coverage tables 31 to 33 discussed previously in FIGS. 6 to 8. The conflict monitor 50 obtains information indicating each channel having a longer busy period than the shortest busy period, master-slave combinations connected by such channels, the data type of signals transferred by the same, and the channels conflicting with the same. The coverage checking unit 53 records the obtained information in relevant data fields of the coverage tables 31 to 33, thereby populating the coverage table database 86.

More specifically, the coverage checking unit 53 populates data fields of the level-3 coverage tables 33 (FIG. 8) with information indicating conflict-suffering channels, i.e., the channels having a longer busy period than the shortest busy period. The coverage checking unit also populates data fields of the level-2 coverage table 32 (FIG. 7) with information indicating each combination of a conflict-suffering channel and its corresponding conflict-causing channel. The coverage checking unit 53 further populates data fields of the level-1 coverage table 31 (FIG. 6) with information indicating the combination of master and slave units 12 and 13 connected by each conflict-suffering channel, as well as the combination of master and slave units 12 and 13 connected by its corresponding conflict-causing channel. While FIG. 10 illustrates separate databases for recording data types, busy periods, and conflict-suspected channels, the recording unit 80 may be modified to provide a unified database storing all the information.

Figure 11:
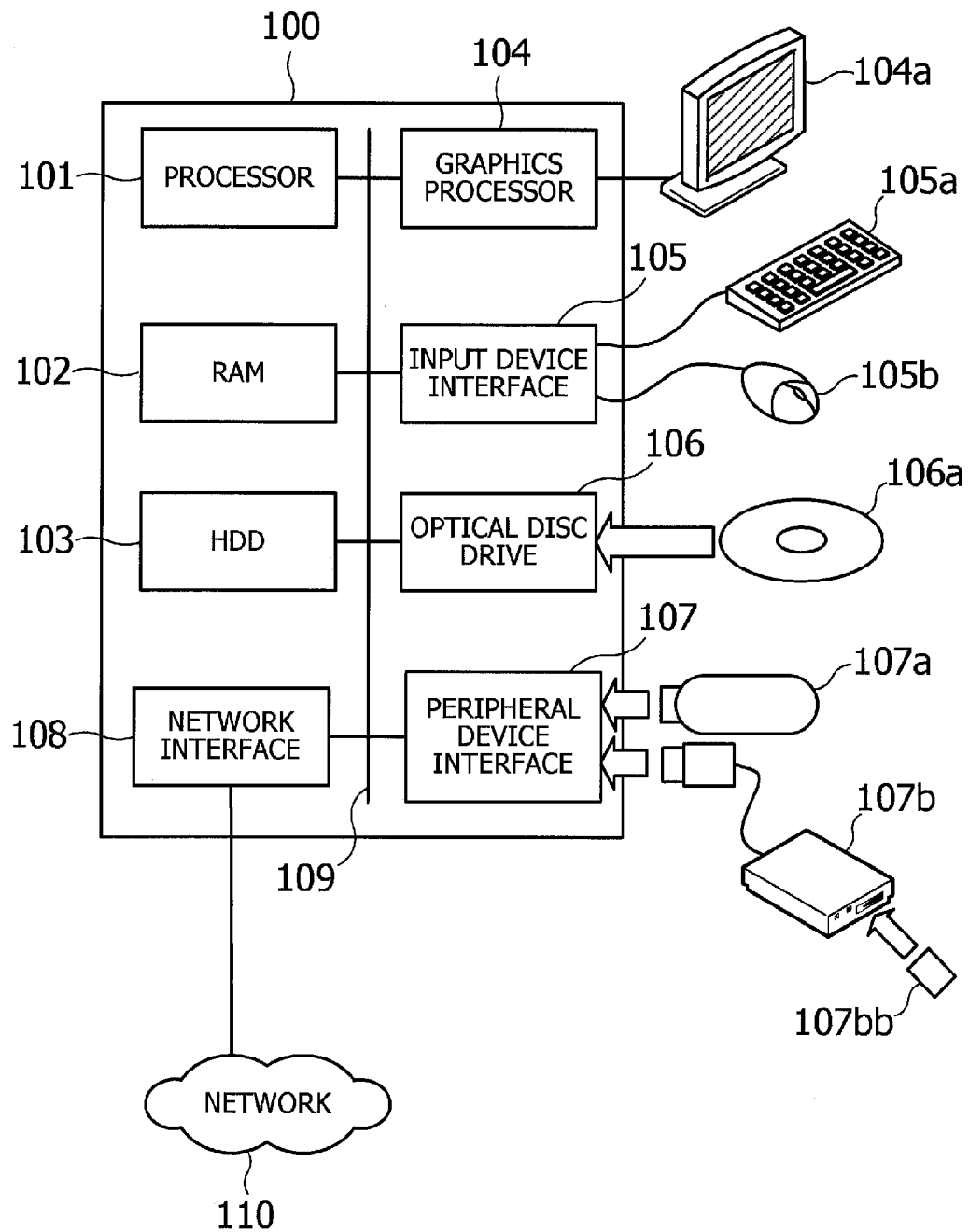
FIG. 11 illustrates an example of hardware configuration of a computer used to implement a verification apparatus.

The above-described processing functions and storage functions of the verification apparatus 60 may be implemented on a computer platform described below. FIG. 11 illustrates an example of hardware configuration of a computer used to implement a verification apparatus. The illustrated computer 100 serves as a verification apparatus 60 under the overall control of its processor 101. The processor 101 is connected to a random access memory (RAM) 102 and other various devices and interfaces on a bus 109. The processor 101 may be a single processing device or a multiprocessor system including two or more processing devices. More specifically, the processor 101 may be, for example, a CPU, micro processing unit (MPU), digital signal processor (DSP), application-specific integrated circuit (ASIC), programmable logic device (PLD), or a combination of two or more such devices.

The RAM 102 serves as a primary storage unit of the computer 100. Specifically, the RAM 102 is used to temporarily store at least some of the operating system (OS) programs and application programs that the processor 101 executes. The RAM 102 may also store other various data objects (e.g., information stored in the recording unit 80) that the processor 101 manipulates at runtime. The recording unit 80 is realized, for example, as the RAM 102.

Other devices on the bus 109 include a hard disk drive (HDD) 103, a graphics processor 104, an input device interface 105, an optical disc drive 106, a peripheral device interface 107, and a network interface 108.

The HDD 103 writes and reads data magnetically on its internal platters. The HDD 103 serves as secondary storage of the computer 100 to store program and data files of the operating system and applications. Another option for the secondary storage is to use flash memory or other semiconductor memory devices.

The graphics processor 104, coupled to a monitor 104a, produces video images in accordance with drawing commands from the processor 101 and displays them on a screen of the monitor 104a. The monitor 104a may be, for example, a cathode ray tube (CRT) display or a liquid crystal display.

The input device interface 105 is connected to input devices such as a keyboard 105a and a mouse 105b and supplies signals from those devices to the processor 101. The mouse 105b is an example of a pointing device, which may be replaced with other kind of pointing devices such as touchscreen, tablet, touchpad, and trackball.

The optical disc drive 106 reads out data encoded on an optical disc 106a, by using laser light. The optical disc 106a is a portable data storage medium, the data recorded on which can be read as a reflection of light or the lack of the same. More specifically, the optical disc 106a may be a digital versatile disc (DVD), DVD-RAM, compact disc read-only memory (CD-ROM), CD-Recordable (CD-R), or CD-Rewritable (CD-RW), for example.

The peripheral device interface 107 is a communication interface used to connect peripheral devices to the computer 100. For example, the peripheral device interface 107 may be used to connect a memory device 107a and a memory card reader/writer 107b. The memory device 107a is a data storage medium having a capability to communicate with the peripheral device interface 107. The memory card reader/writer 107b is an adapter used to write data to or read data from a memory card 107bb, which is a data storage medium in the form of a small card.

The network interface 108 is coupled to a network 110 so as to exchange data with other computers or network devices (not illustrated) via the network 110.

The above-described hardware configuration may be used to implement processing and storage functions of the verification apparatus 60. For example, the illustrated computer 100 implements various processing functions of the proposed verification apparatus 60 by executing programs stored in a computer-readable storage medium. Various storage media are capable of storing such programs. For example, the computer 100 may store its program files in the HDD 103. The processor 101 loads the RAM 102 with at least part of the programs stored in the HDD 103 and executes the programs on the RAM 102. It is also possible to store the programs in an optical disc 106a, memory device 107a, memory card 107bb, or other computer-readable portable storage media. The programs stored in such a portable storage medium are installed in the HDD 103 under the control of the processor 101, so that they are ready to execute upon request. Where appropriate, the processor 101 may execute program codes read out of the portable storage medium, without installing them in its local storage device.

The HDD 103 in the computer 100 is loaded with data for conflict verification, which include, for example, RTL models of a DUT 10 and a conflict monitor 50 and a set of scenarios 70 (scenarios 71 and 72). Also stored in the HDD 103 is a logic simulator. The verification apparatus 60 executes logic simulation of the given DUT 10. Actually, the computer 100 executes this simulation by using the scenarios 70, DUT 10, and conflict monitor 50 stored in the HDD 103.

The above-noted RTL models of the DUT 10, or of both the DUT 10 and conflict monitor 50, may be expanded into a field programmable gate array (FPGA). The verification apparatus 60 uses the FPGA as a logic emulator. In this case, the verification apparatus 60 executes logic emulation of the given DUT 10 by using an instruction set simulator stored in the HDD 103 of the computer 100.

Figure 12:
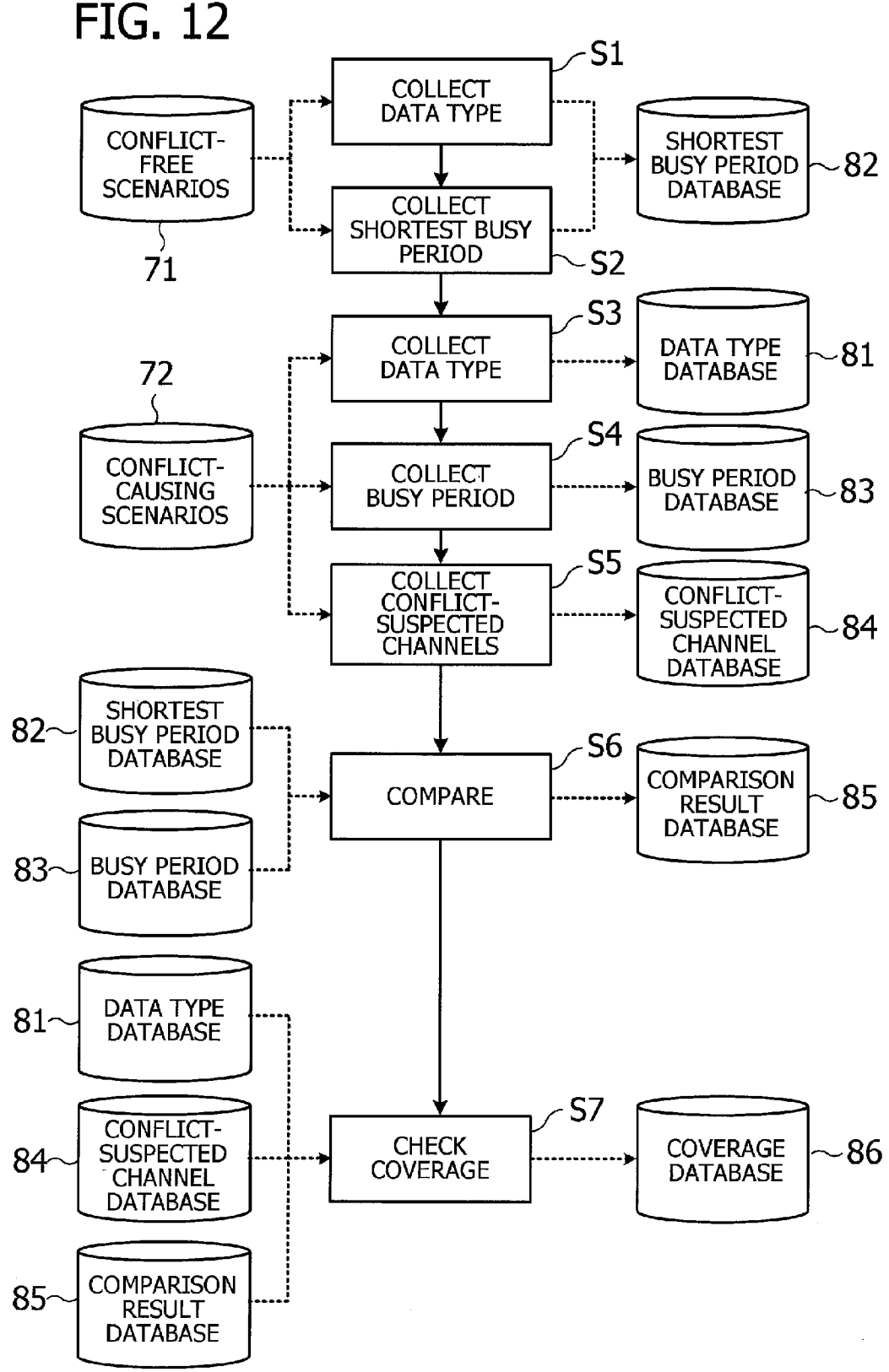
FIG. 12 illustrates an example of a process flow of the proposed verification apparatus.

The above verification apparatus 60 executes a verification process as follows. FIG. 12 illustrates an example of a process flow of the verification apparatus 60. Specifically, the verification apparatus 60 causes the DUT 10 to execute conflict-free scenarios 71. During this execution, the conflict monitor 50 watches the behavior of each channel. The conflict-free scenarios 71 are each configured to activate a single combination of master and slave units 12 and 13 at a time, meaning that the DUT 10 would experience none of the foregoing types of conflict in those scenarios. Inside the verification apparatus 60, the data type capturing unit 51a in the conflict monitor 50 collects information indicating the data type of signals transferred over each channel of the DUT 10 (step S1). Further the busy period capturing unit 51b collects information indicating the shortest busy period of each channel (step S2). The information obtained at these steps are recorded in the shortest busy period database 82.

The verification apparatus 60 then subjects the DUT 10 to conflict-causing scenarios 72, while keeping the conflict monitor 50 watching the behavior of each channel. The conflict-causing scenarios 72 are designed to let the DUT 10 (e.g., integrated circuit) execute their intended functions by activating the master units 12 and slave units 13 in various combinations. These scenarios 72 are thus expected to produce the three types of conflict discussed previously. In the verification apparatus 60, the data type capturing unit 51a collects information about the data type of signals transferred by each channel of the DUT 10 (step S3), and the busy period capturing unit 51b collects information about the shortest busy period of each channel (step S4). The channel conflict capturing unit 51c further collects information about conflict-suspected channels (step S5). That is, a channel may have a busy period that overlaps at least in part with busy periods of other channels. The verification apparatus 60 seeks the latter channels as conflict-suspected channels of the former channel. The information obtained above for each channel is entered to appropriate databases. More specifically, the obtained data type information is recorded in a data type database 81. The obtained busy period information is recorded in a busy period database 83. The obtained conflict-suspected channel information (together with information indicating the combination of a master unit 12 and a slave unit 13 of each channel) is recorded in a conflict-suspected channel database 84.

The verification apparatus 60 now triggers its comparing unit 52 to compare the busy periods of each channel obtained at step S4 with the shortest busy period obtained at step S2 (step S6). If a channel has a busy period longer than its shortest busy period, the comparing unit 52 records the information indicating the channel in a comparison result database 85.

The verification apparatus 60 further activates its coverage checking unit 53 to check the test coverage (step S7), i.e., enters data to a coverage table database 86 according to the data type information obtained at step S3, the conflict-suspected channel information obtained at step S5, and the result of the comparison at step S6.

More specifically, the coverage table database 86 has data space corresponding to the foregoing coverage tables 31 to 33 of three different levels. For the level-3 coverage table 33, the coverage checking unit 53 populates the coverage table database 86 with information indicating the data type of signals transferred by a conflict-suffering channel, i.e., a channel having a busy period longer than its shortest busy period. For the level-2 coverage table 32, the coverage checking unit 53 populates the coverage table database 86 with information indicating the combination of each conflict-suffering channel and its corresponding conflict-causing channel (conflict-suspected channel). For the level-1 coverage table 31, the coverage checking unit 53 populates the coverage table database 86 with the information indicating the master-slave combination of each conflict-suffering channel and that of its corresponding conflict-causing channel. The coverage checking unit 53 constructs the coverage table database 86 in this way with information corresponding to the level-1 to level-3 coverage tables 31 to 33.

The next section will describe a more specific conflict verification method executed by the above verification apparatus 60.

Figure 13:
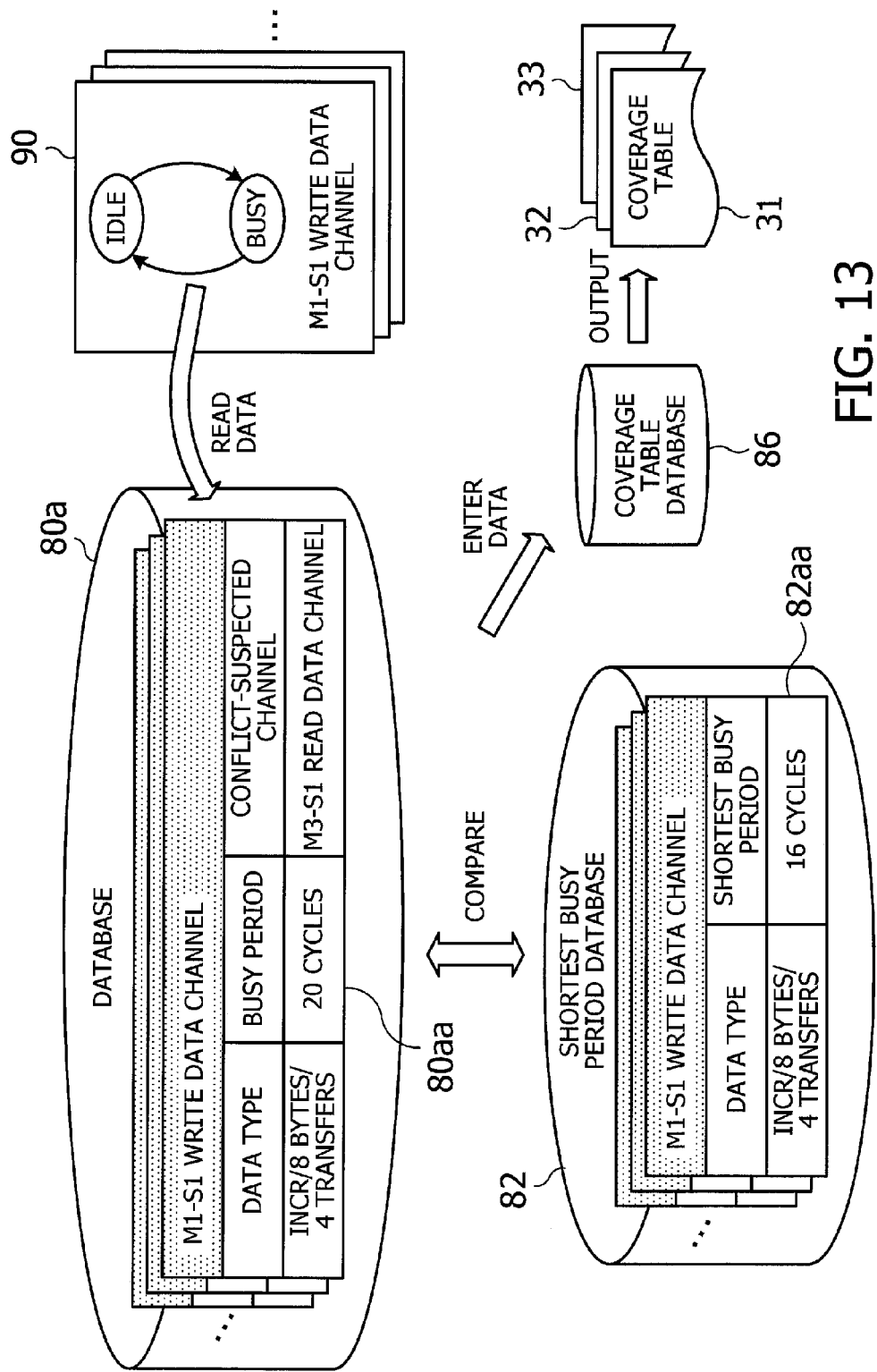
FIG. 13 illustrates an example of a conflict verification method.

FIG. 13 illustrates an example of a conflict verification method. As discussed in FIGS. 9 and 10, the proposed verification apparatus 60 has a conflict monitor 50 coupled the DUT 10 to watch the behavior of each of the write address channels 41, write data channels 42, write response channels 43, read address channels 44, and read data channels 45. The DUT 10 in the verification apparatus 60 operates with conflict-free scenarios 71, during which the state machine unit 51 in the conflict monitor 50 collects information about the data type and shortest busy period of each activated channel and stores them in a shortest busy period database 82. FIG. 14 illustrates an example of this shortest busy period database 82.

The illustrated shortest busy period database contains information about shortest busy periods observed in the write address channels 41, read address channels 44, and write response channels 43, which connect three master units M1, M2, and M3 (12) with three slave units S1, S2, and S3 (13) in various combinations. Each recorded value of the shortest busy period thus corresponds to a particular master-slave combination. For the write data channels 42 and read data channels 45, on the other hand, the shortest busy period database 82 stores the shortest busy period of each particular data type used in each particular master-slave combination. The data types seen in the example of FIG. 14 are based on the specifications of AXI bursts. Different values of shortest busy period may be recorded for the write data channels 42 and read data channels 45 of different master-slave combinations, depending on the type of data bursts to be transferred.

The shortest busy period database 82 thus records information indicating the shortest busy period of each channel in the DUT 10, which optionally depends on the data types. This information has been collected by the state machine unit 51 in the conflict monitor 50.

The DUT 10 in the verification apparatus 60 then operates with conflict-causing scenarios 72. During this course, the state machine unit 51 in the conflict monitor 50 collects information indicating the type of data transferred by write data channels and read data channels, as well as busy periods and conflict-suspected channels of each activated channel. The recording unit 80 records the collected information its local database 80a. FIG. 15 illustrates an example of this database 80a.

The illustrated database 80a in FIG. 15 contains information describing busy period and conflict-suspected channel for write address channels 41, read address channels 44, and write response channels 43. For write data channels 42 and read data channels 45, the database 80a contains information describing data type, in addition to shortest busy period and conflict-suspected channel. The database 80a stores multiple sets of such information, one for each different combination of master units M1, M2, and M3 and slave units S1, S2, and S3.

The database 80a thus stores records of busy periods and conflict-suspected channels of each channel in the DUT 10, optionally together with information on data types. This information has been collected by the state machine unit 51 in the conflict monitor 50.

Here the conflict monitor 50 monitors each channel in the DUT 10 and, when a monitored channel makes a busy-to-idle transition, captures a busy period (or shortest busy period) and conflict-suspected channel, as well as data types in the case of write and read data channels as discussed above. With reference to FIGS. 16A to 21B, the following section provides more specific examples of how the conflict monitor 50 collect such information.

Figure 16A:
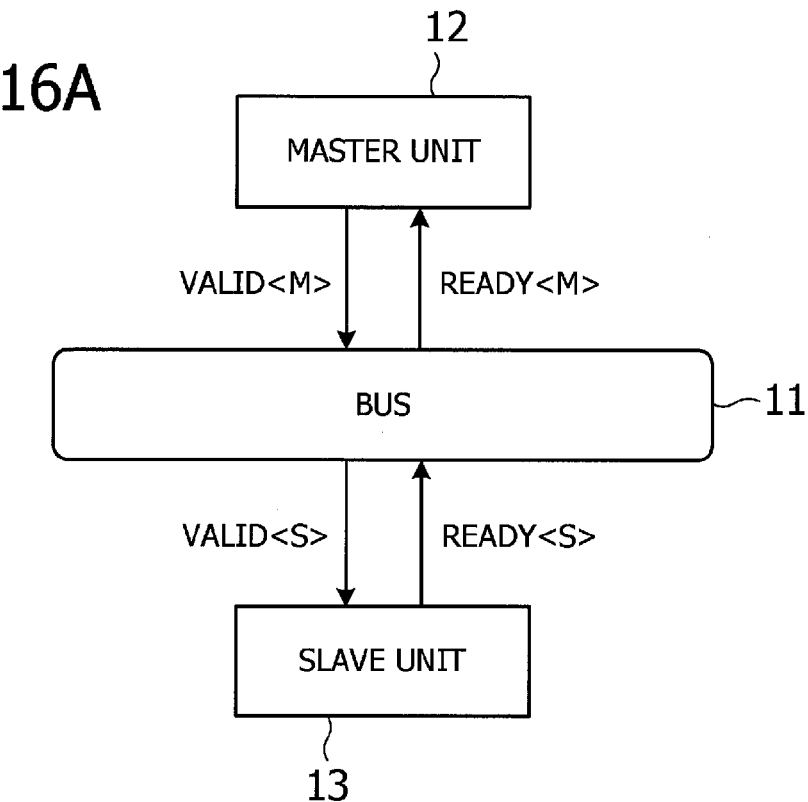
FIGS. 16A and 16B are a first pair of diagrams illustrating data acquisition by a conflict monitor.
Figure 16B:
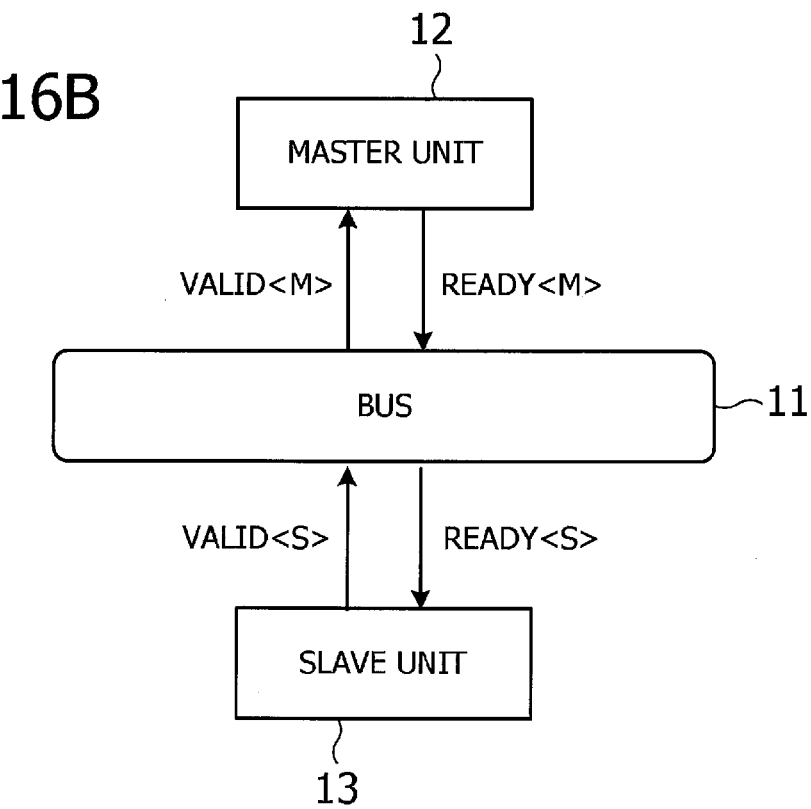

As seen in FIGS. 16A and 16B, a master unit 12 (M1, M2, M3) exchanges VALID and READY signals with the bus 11 when it transfers information signals to or from a slave unit 13 (S1, S2, S3). A slave unit 13 (S1, S2, S3) also exchanges its own VALID and READY signals with the bus 11.

Referring to FIG. 16A, a master unit 12 sends a request signal VALID<M> to the bus 11, and the bus 11 returns a signal READY<M> to the master unit 12 to indicate acceptance of the request. The bus 11 sends a request signal VALID<S> to a slave unit 13, and the slave unit 13 returns a signal READY<S> to the bus 11 to indicate acceptance of the request. This handshake is used to transfer write address, write data, and read address.

Referring to FIG. 16B, a slave unit 13 sends a request signal VALID<S> to the bus 11, and the bus 11 returns a signal READY<S> to the slave unit 13 to indicate acceptance of the request. The bus 11 sends a request signal VALID<M> to a master unit 12, and the master unit returns a signal READY<M> to the bus 11 to indicate acceptance of the request. This handshake is used to transfer write response and read data. The conflict monitor 50 watches such VALID and READY signals to determine whether a channel is in busy state or idle state.

Figure 17A:
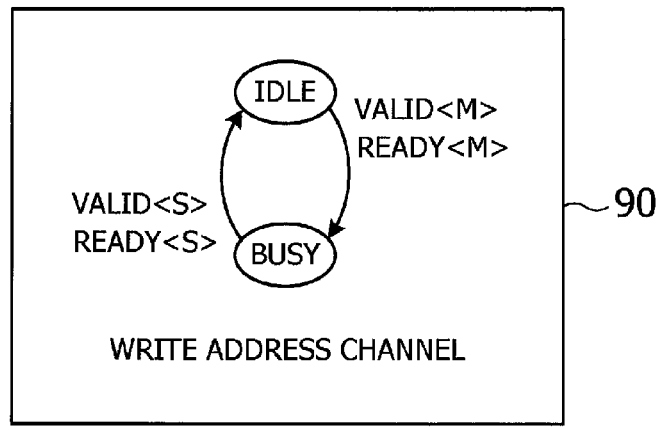
FIGS. 17A and 17B are a second pair of diagrams illustrating data acquisition by a conflict monitor.
Figure 17B:
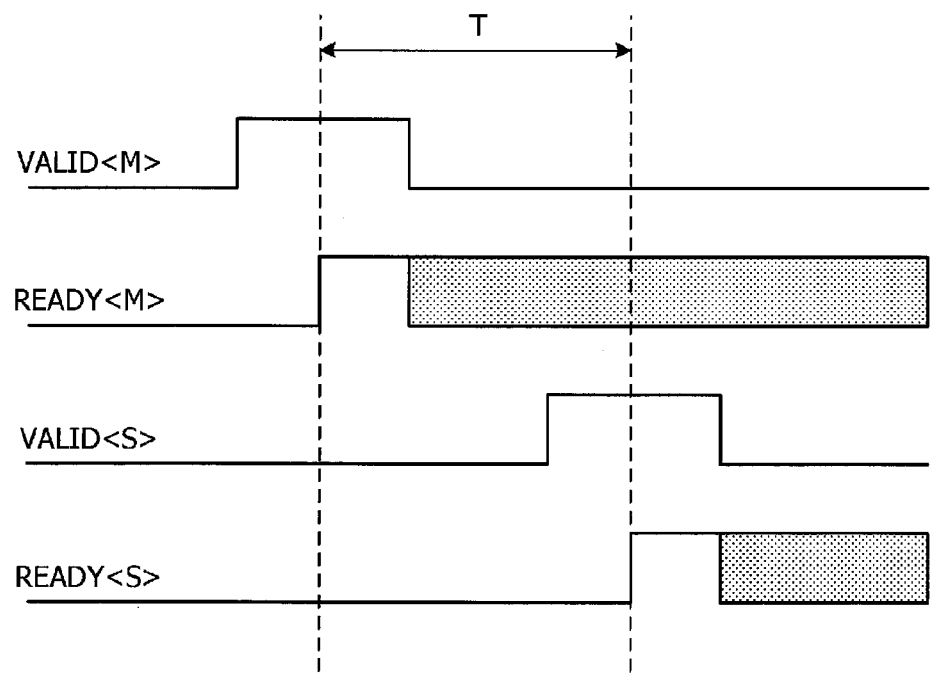

FIGS. 17A and 17B illustrate an example of a state machine and signal waveforms of a write address channel. The illustrated state machine 90 of FIG. 17A and waveforms of FIG. 17B represent an exemplary behavior of a write address channel 41 between a certain master unit 12 and a certain slave unit 13. In this write address channel 41, the master unit 12 asserts VALID<M>, to which the bus 11 responds with READY<M>. After that, the bus 11 asserts VALID<S>, to which the slave unit 13 responds with READY<S>. The master unit 12 produces write address signals (not illustrated), and the write address channel starts to transfer them in response to READY<M> from the bus 11 to the master unit 12. The signals are received by the slave unit 13 when it returns READY<S> to the bus 11.

Note that the write address channel 41 stays in busy state during the period between READY<M> and READY<S>. This period is captured as a busy period T of the write address channel 41.

Figure 18A:
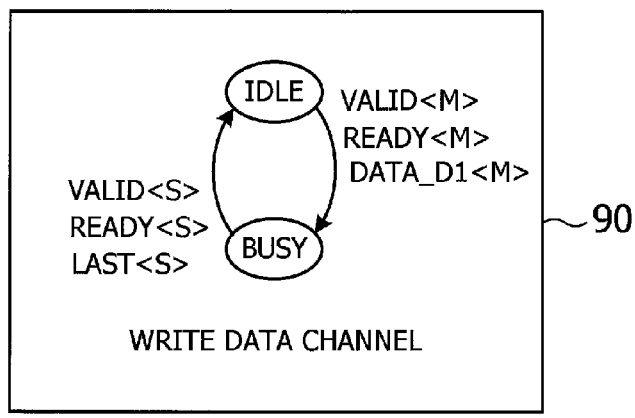
FIGS. 18A and 18B are a third pair of diagrams illustrating data acquisition by a conflict monitor.
Figure 18B:
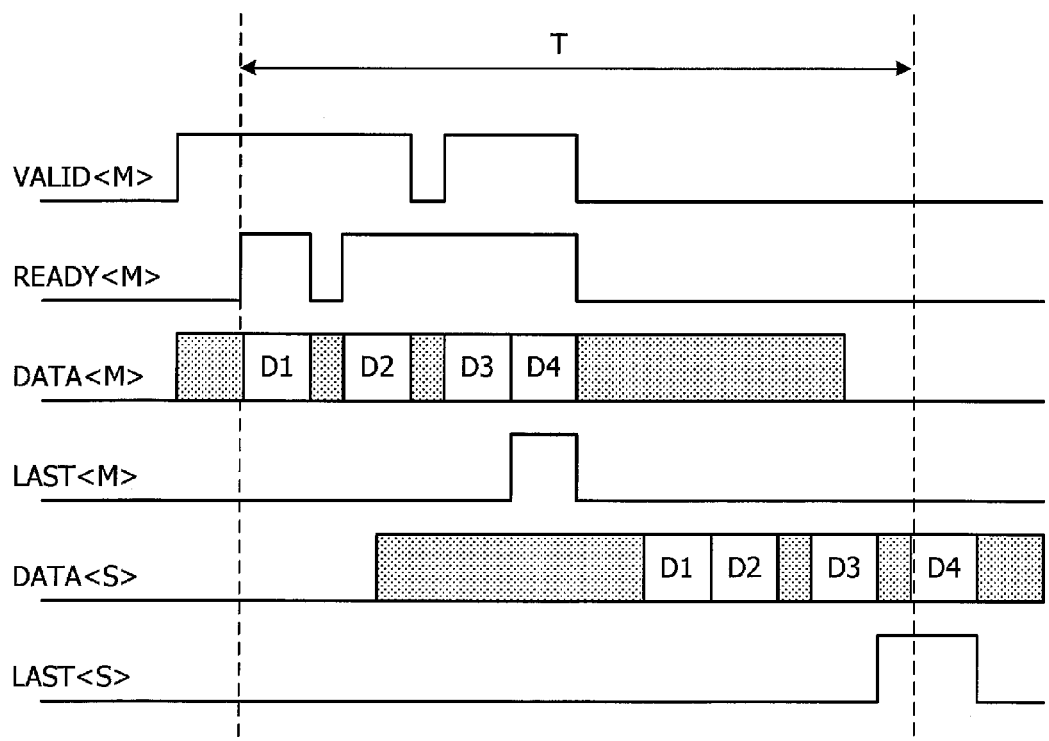

FIGS. 18A and 18B illustrate an example of a state machine and signal waveforms of a write data channel. The illustrated state machine 90 of FIG. 18A and waveforms of FIG. 18B represent a typical behavior of a write data channel 42 between a certain master unit 12 and a certain slave unit 13. In this example, the master unit 12 asserts VALID<M>, and the bus 11 responds to it with READY<M>. The write data channel 42 then starts to transfer write data as seen in DATA<M> of FIG. 18B, during which D1, D2, D3, and D4 are sent in a burst of four transfers. The master unit 12 also sends LAST<M> to signify the tail end D4 of the write data burst.

Then the bus 11 asserts VALID<S>, and the slave unit 13 responds to it with READY<S> (not depicted in FIG. 18B). The write data channel 42 transfers write data as seen in DATA<S> of FIG. 18B, during which D1, D2, D3, and D4 are sent in a burst of four transfers. The bus 11 sends LAST<S> to the slave unit 13 to signify the tail end D4 of the write data burst.

Note that the write data channel 42 stays in busy state during the period from the first transfer of write data D1 by the master unit 12 to the receipt of the last piece D4 of write data by the slave unit 13. This period is captured as a busy period T of the write data channel 42.

Figure 19A:
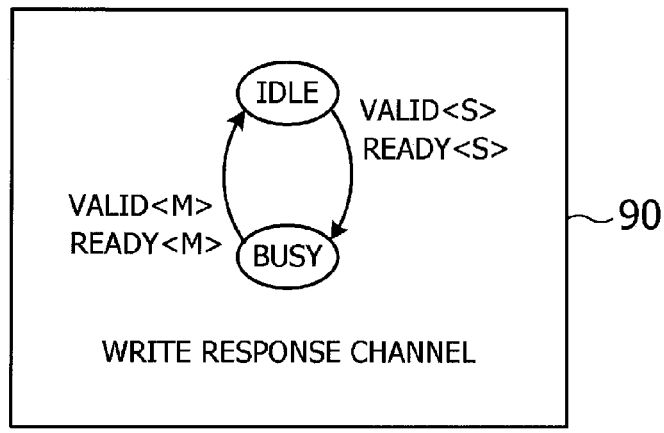
FIGS. 19A and 19B are a fourth pair of diagrams illustrating data acquisition by a conflict monitor.
Figure 19B:
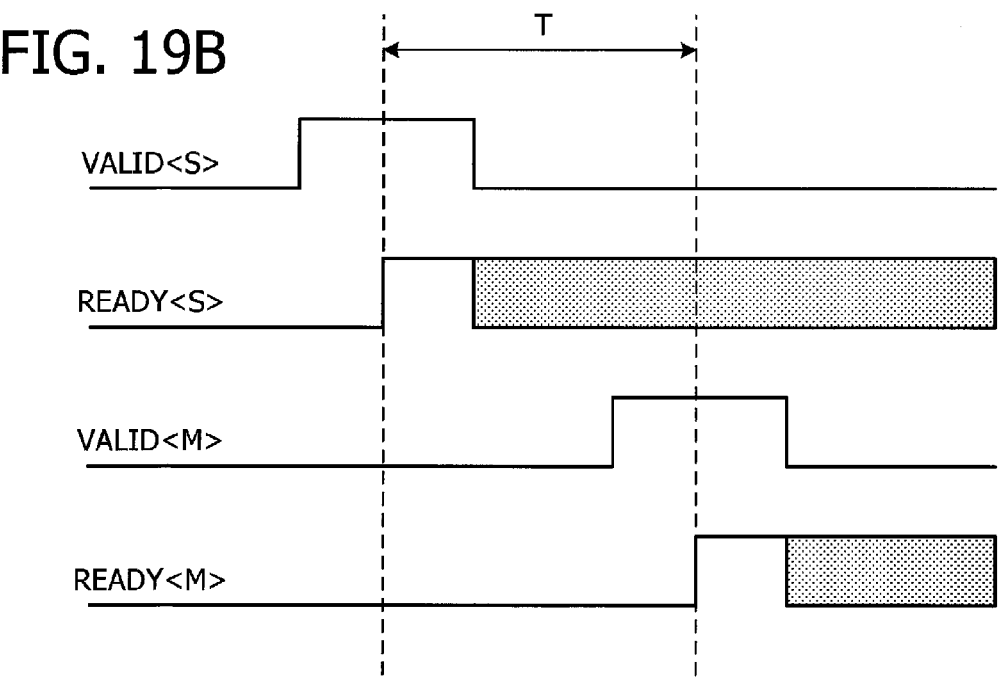

FIGS. 19A and 19B illustrate an example of a state machine and signal waveforms of a write response channel. The illustrated state machine 90 of FIG. 19A and waveforms of FIG. 19B represent a typical behavior of a write response channel 43 between a certain master unit 12 and a certain slave unit 13. In this write response channel 43, the slave unit 13 asserts VALID<S>, to which the bus 11 responds with READY<S>. After that, the bus 11 asserts VALID<M>, to which the master unit 12 responds with READY<M>. The write response channel 43 starts to transfer a write response signal (not illustrated) of the slave unit 13 in response to READY<S> from the bus 11 to the slave unit 13. The master unit 12 receives the write response signal at the time of READY<M> to the bus 11.

Note that the write response channel 43 stays in busy state during the period between READY<S> and READY<M>. This period is captured as a busy period T of the write response channel 43.

Figure 20A:
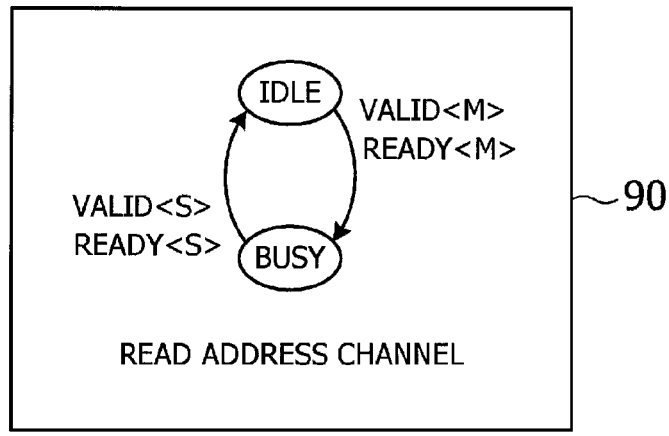
FIGS. 20A and 20B are a fifth pair of diagrams illustrating data acquisition by a conflict monitor.
Figure 20B:
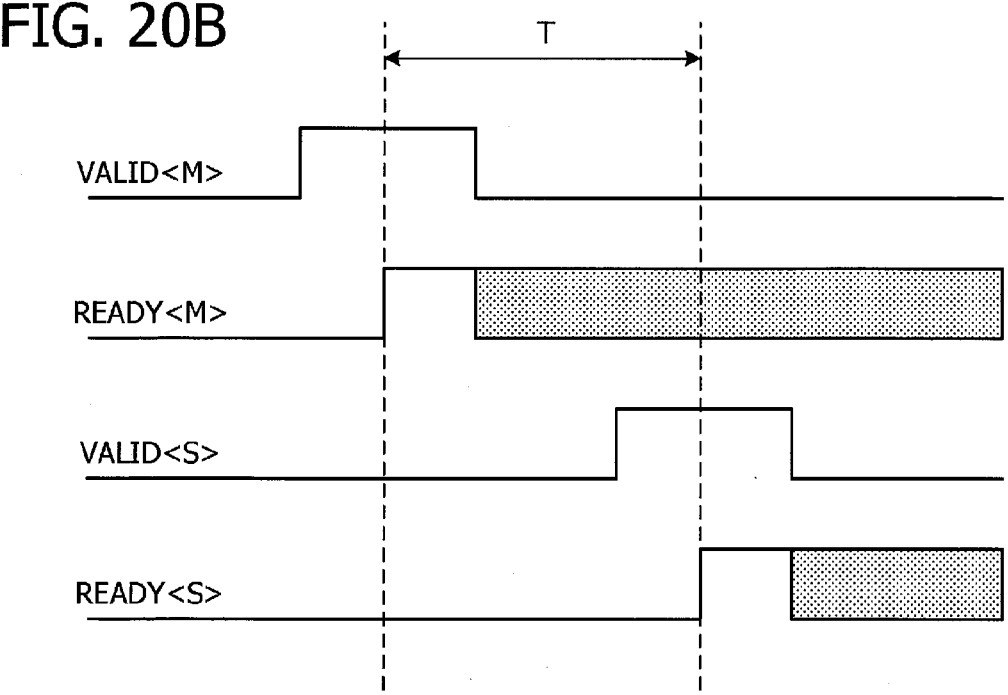

FIGS. 20A and 20B illustrate an example of a state machine and signal waveforms of a read address channel. The illustrated state machine 90 of FIG. 20A and waveforms of FIG. 20B represent a typical behavior of a read address channel 44 between a certain master unit 12 and a certain slave unit 13. In this read address channel 44, the master unit 12 asserts VALID<M>, to which the bus 11 responds with READY<M>. After that, the bus 11 asserts VALID<S>, to which the slave unit 13 responds with READY<S>. The read address channel 44 starts to transfer a read address signal (not illustrated) of the master unit 12 in response to READY<M> from the bus 11 to the master unit 12. The slave unit 13 receives the read address signal at the time of READY<S> to the bus 11.

Note that the read address channel 44 stays in busy state during the period between READY<M> and READY<S>. This period is captured as a busy period T of the read address channel 44.

Figure 21A:
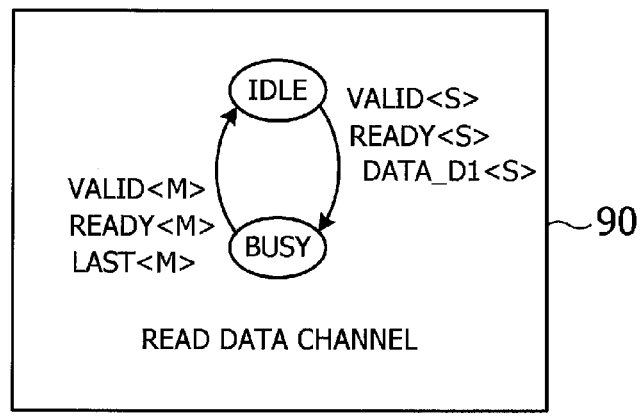
FIGS. 21A and 21B are a sixth pair of diagrams illustrating data acquisition by a conflict monitor.
Figure 21B:
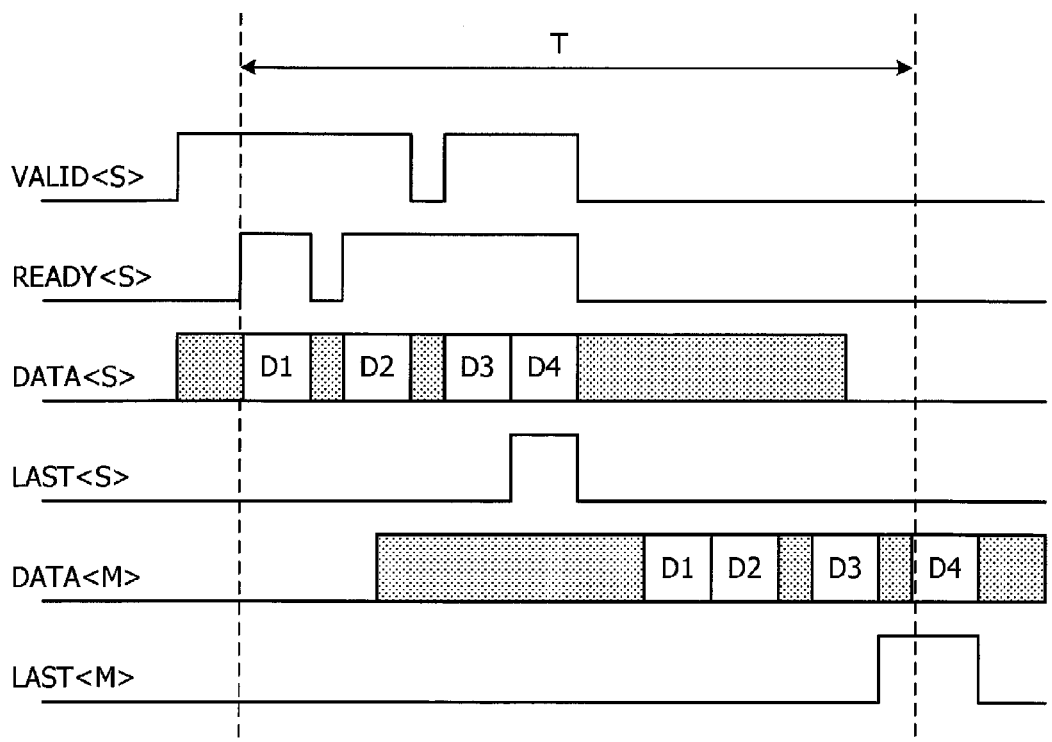

FIGS. 21A and 21B illustrate an example of a state machine and signal waveforms of a read data channel. The illustrated state machine 90 of FIG. 21A and waveforms of FIG. 21B represent a typical behavior of a read data channel 45 between a certain master unit 12 and a certain slave unit 13. In this read data channel 45, the slave unit 13 asserts VALID<S>, and the bus 11 responds to it with READY<S>. The read data channel 45 starts to transfer read data as in DATA<S> of FIG. 21B, during which D1, D2, D3, and D4 are sent in a burst of four transfers. The slave unit 13 also sends LAST<S> to signify the tail end D4 of the read data burst.

Then the bus 11 asserts VALID<M>, and the master unit 12 responds to it with READY<M> (not illustrated in FIG. 21B). This permits the read data channel 45 to transfer the read data as seen in DATA<M> of FIG. 21B, during which D1, D2, D3, and D4 are sent in a burst of four transfers. The bus 11 sends LAST<M> the master unit 12 to signify the tail end D4 of the read data burst.

Note that the read data channel 45 stays in busy state during the period from the first transfer of read data D1 by the slave unit 13 to the receipt of the last piece D4 of read data by the master unit 12. This period is captured as a busy period T of the read data channel 45.

As described previously in FIG. 13, the conflict monitor 50 collects various information about transferred signals of each monitored channel when its corresponding state machine 90 makes a state transition from busy to idle. More specifically, the conflict monitor 50 has a state machine unit 51 to capture data types (in write data channels and read data channels), conflict-suspected channels, and busy periods. The conflict monitor records the collected information in the foregoing database 80a (see FIGS. 13 and 15). Similarly, the conflict monitor 50 captures the data type of transferred signals and the shortest busy period at busy-to-idle transitions in the state machine 90 of each channel, and records the collected information in the foregoing shortest busy period database 82 (see FIGS. 13 and 14). The busy period of a channel may wholly or partly overlap with a busy period of some other channel. The conflict monitor 50 identifies the latter channel as a conflict-suspected channel of the former channel.

Figure 22:
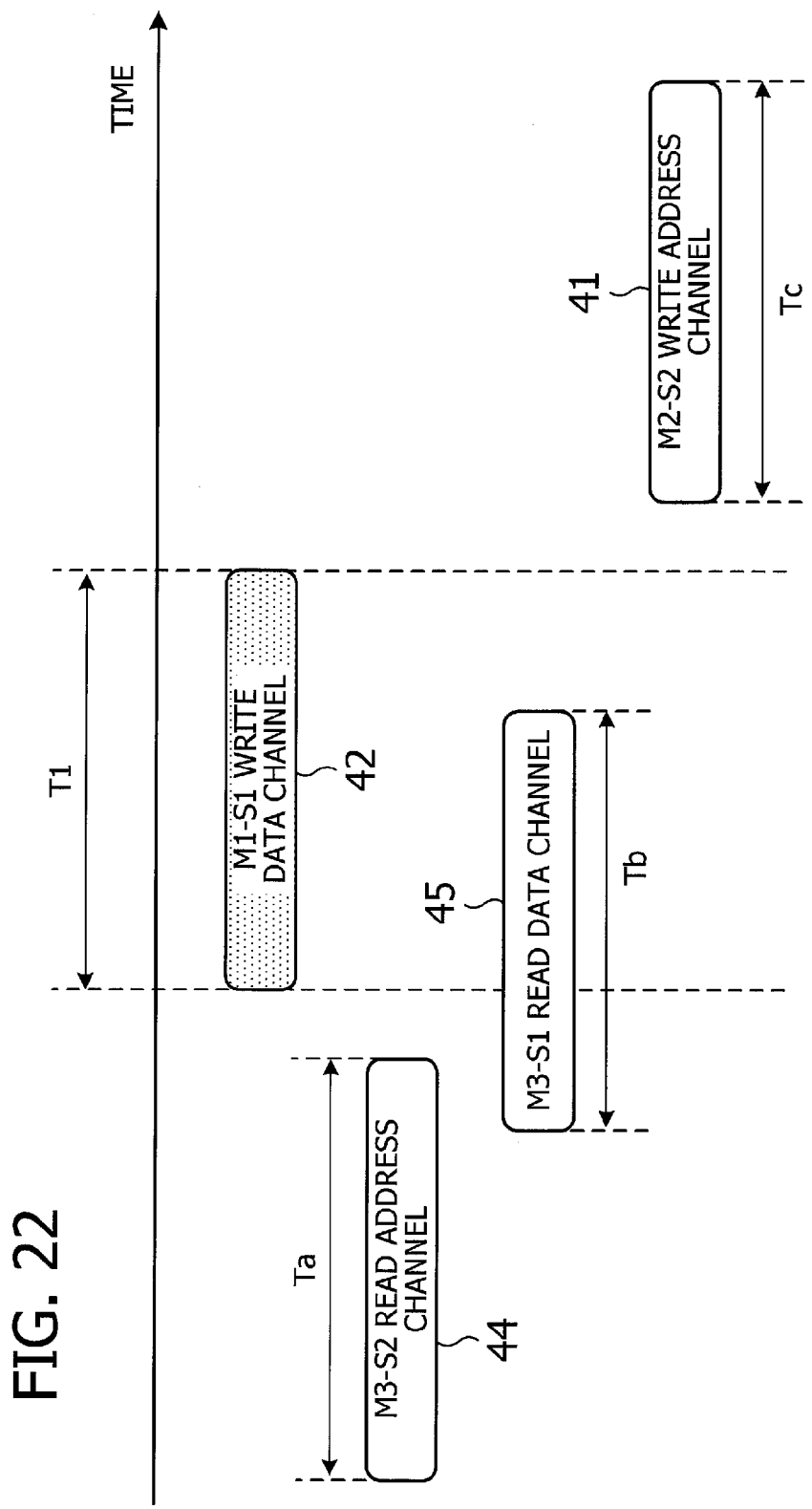
FIG. 22 illustrates conflict-suspected channels.

The following discussion focuses on a write data channel 42 of a master-slave combination M1-S1. FIG. 22 schematically depicts busy period T1 of this M1-S1 write data channel 42, together with busy period Ta of a read address channel 44 for M3-S2, busy period Tb of a read data channel 45 for M3-S1, and busy period Tc of a write address channel 41 for M2-S2.

In the example of FIG. 22, busy period Tb of the M3-S1 read data channel 45 partly overlaps with busy period T1 of the M1-S1 write data channel 42 of interest. It is determined in this case that the M3-S1 read data channel 45 is a conflict-suspected channel of the M1-S1 write data channel 42.

The other two channels in FIG. 22, i.e., M3-S2 read address channel 44 and M2-S2 write address channel 41, are not conflict-suspected channels because neither of their busy periods Ta and Tc overlaps with busy period T1 of the M1-S1 write data channel 42 of interest.

The conflict monitor 50 uses a channel conflict capturing unit 51c in its state machine unit 51 to find such conflict-suspected channels having a busy period overlapping at least partly with that of a particular channel. In the case of write data channels and read data channels, the channel conflict capturing unit 51c finds their conflict-suspected channels specific to each different data type. The conflict monitor 50 records the collected information about conflict-suspected channels in a database 80a.

As can be seen from the above example, the proposed verification apparatus 60 collects various information by using a state machine unit 51 in the conflict monitor 50 and builds a shortest busy period database 82 and a database 80a from the collected information. The conflict monitor 50 then activates its comparing unit 52 to compare each channel's busy periods recorded in the database 80a with the shortest busy period indicated by a relevant piece of information in the shortest busy period database 82.

For example, the state machine unit 51 in the conflict monitor 50 collects information indicating the type of transferred write data, as well as the busy period, of the M1-S1 write data channel 42, when its corresponding state machine 90 (see FIG. 13) makes a busy-to-idle transition. During this course, the state machine unit 51 also collects information about conflict-suspected channels. The conflict monitor 50 builds a database 80a from the collected information. Referring to the example in FIG. 13, information 80aa of the database 80a describes a transaction in the M1-S1 write data channel 42. This information 80aa specifically indicates that an incrementing-address burst ("INCR") was performed with a burst size of eight bytes ("8 BYTES") and a burst length of four transfers ("4 TRANSFERS"), as in the data type of "INCR/8 BYTES/4 TRANSFERS" in FIG. 13. The information 80aa also indicates that the busy period of the data transfer was 20 cycles in length, and that the channel might have conflicted with a read data channel 45 of M3-S1 (FIG. 22). It is noted that the database 80a contains as many such pieces of information as [the number of master units]×[the number of slave units]×[the number of channels]×[the number of data types].

The shortest busy period database 82 in FIG. 13 contains information 82a corresponding to the above-described information 80aa in the database 80a. This information 82aa indicates the shortest busy period of the M1-S1 write data channel 42 in the case of a data type of "INCR/8 BYTES/4 TRANSFERS." As an example, the shortest busy period in the information 82aa is 16 cycles. It is noted that the shortest busy period database 82 contains as many such pieces of information as [the number of master units]×[the number of slave units]×[the number of channels]×[the number of data types].

The comparing unit 52 in the conflict monitor 50 compares the busy period in the information 80aa with the shortest busy period in the information 82aa, both being of the M1-S1 write data channel 42. In the example of FIG. 13, the busy period is 20 cycles in length, which is longer than the shortest busy period of 16 cycles. Accordingly, the conflict monitor 50 determines that the M3-S1 read data channel 45 registered in the information 80aa is the conflict-causing channel of the M1-S1 write data channel 42. In other words, the status of this M3-S1 read data channel 45 is changed from conflict-suspected channel to conflict-causing channel.

Figure 23:
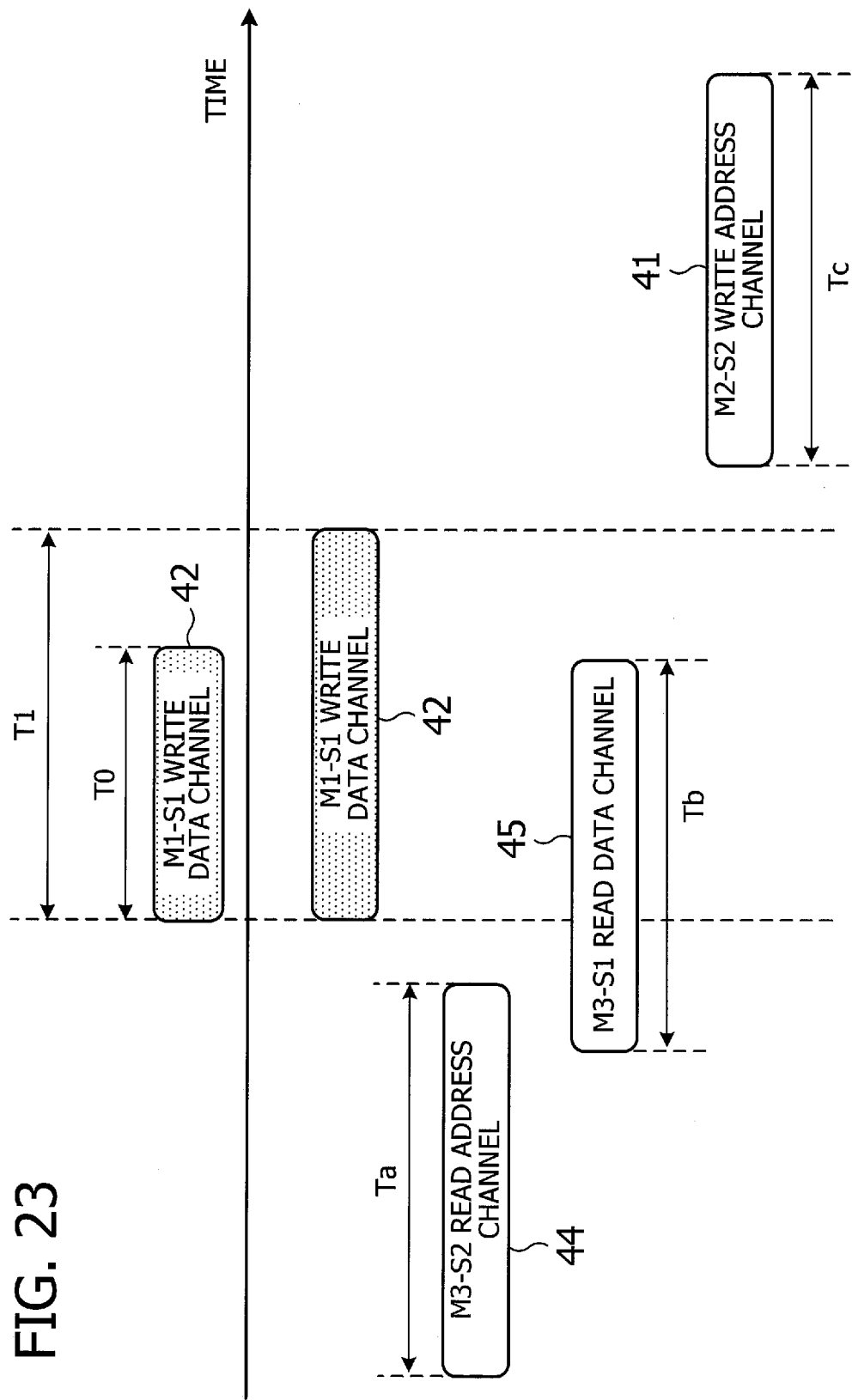
FIG. 23 illustrates conflict-causing channels.

FIG. 23 illustrates conflict-causing channels. FIG. 23 schematically depicts, among other things, busy period T1 and shortest busy period T0 of a write data channel 42 for M1-S1, together with busy period Tb of a read data channel 45 for M3-S1. Busy period Tb of the M3-S1 read data channel 45 partly overlaps with busy period T1 of the M1-S1 write data channel 42.

As seen in FIG. 23, busy period T1 of the M1-S1 write data channel 42 is longer than the shortest busy period T0 of the same. This comparison result of T1>T0 permits the conflict monitor 50 to recognize a conflict of the M1-S1 write data channel 42 with some other channel. The foregoing database 80a in the example of FIG. 13 registers the M3-S1 read data channel 45 as a conflict-suspected channel (see also FIG. 22). Since T1>T0, the conflict monitor 50 concludes that the above M3-S1 read data channel 45 is the conflict-causing channel of the M1-S1 write data channel 42. In other words, the status of this M3-S1 read data channel 45 is changed from conflict-suspected channel to conflict-causing channel.

In addition to the above, FIG. 23 illustrates busy period Ta of a read address channel 44 for M3-S2 and busy period Tc of a write address channel 41 for M2-S2. These busy periods Ta and Tc, however, do not overlap with busy period T1 of the M1-S1 write data channel 42 of interest. Accordingly, neither of those two channels is qualified as a conflict-suspected channel or conflict-causing channel.

As discussed previously in FIG. 13, the conflict monitor 50 causes its coverage checking unit 53 to enter new data to the coverage table database 86 in the recording unit 80 when a busy period of the M1-S1 write data channel 42 is found to be longer than its shortest busy period. For example, the coverage checking unit 53 searches the database 80a to extract information (e.g., information 80aa discussed above) that contains busy periods longer than the shortest busy period and populates the coverage table database 86 with the extracted information.

In the example of FIG. 13, the coverage table database 86 receives information that indicates a conflict-suffering master-slave combination M1-S1 in conjunction with a conflict-causing master-slave combination M3-S1. This information is mapped to a specific cell in the level-1 coverage table 31 (FIG. 6). The coverage table database 86 also receives information that indicates a write data channel 42 in conjunction with a read data channel 45. This information is mapped to a specific cell in the level-2 coverage table 32 (FIG. 7). The coverage table database 86 further receives information representing a data type of "INCR/8 bytes/4 transfers." This information is mapped to a specific cell in the level-3 coverage table 33 (FIG. 8).

Based on such information in the coverage table database 86, the verification apparatus 60 produces coverage tables 31 to 33 of level 1 to level 3 and outputs them to an attached monitor 104a or the like.

Figure 24:
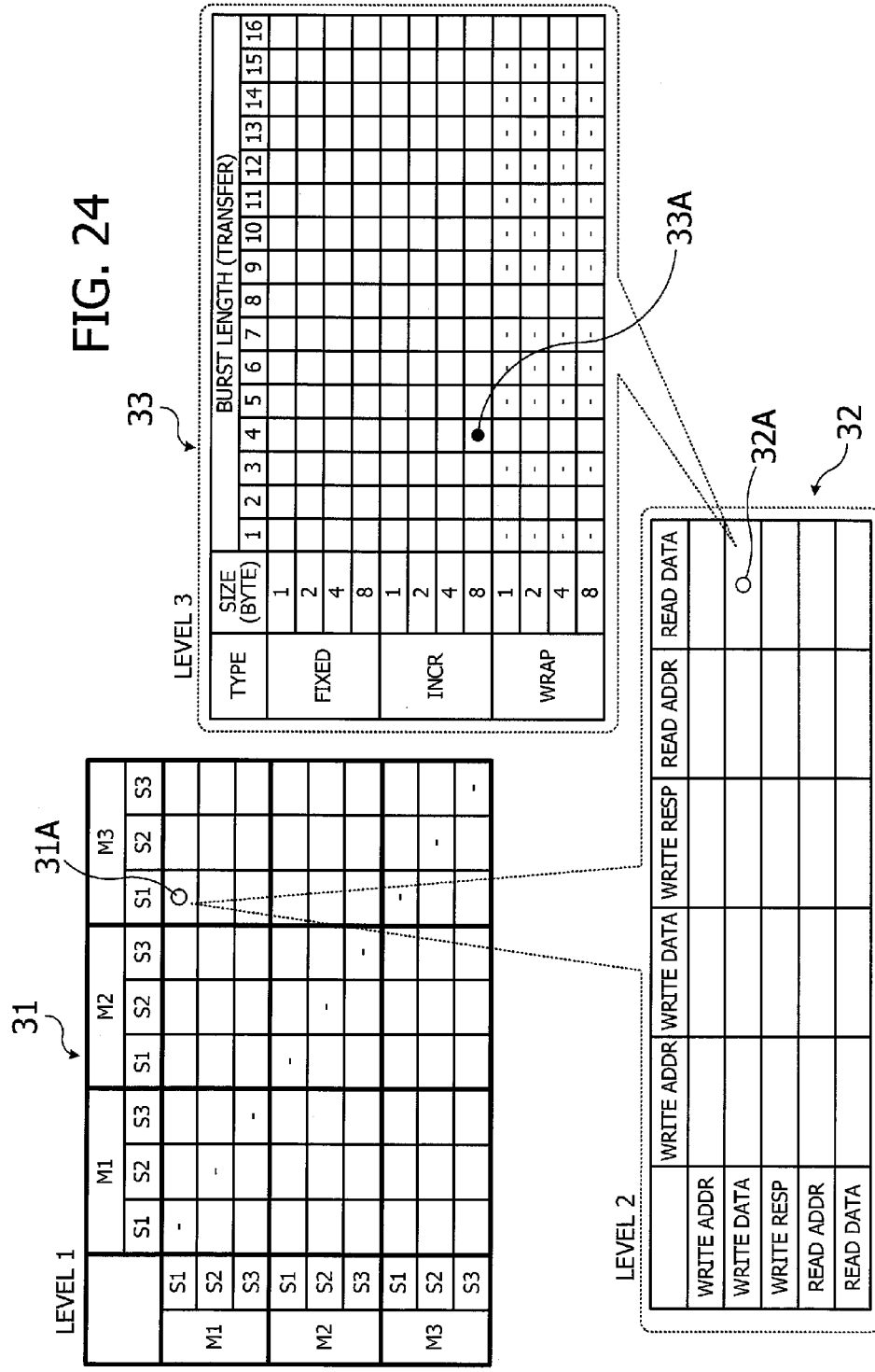
FIGS. 24 to 27 are first to fourth diagrams illustrating an example of how coverage tables are produced.

FIGS. 24 to 27 illustrate an example of coverage table output. Specifically, FIG. 24 illustrates coverage tables 31 to 33 of level-1 to level-3 produced from the data exemplified in FIG. 13. For example, the illustrated level-1 coverage table 31 has been produced from information in the coverage table database 86, in which a mark 31A (white circle) is placed at the intersection of a row of M1-S1 and a column of M3-S1 to represent a conflict between those two master-slave combinations. The illustrated level-2 coverage table 32 has similarly been produced from information in the coverage table database 86, in which a mark 32A (white circle) is placed at the intersection of a row of write data channel 42 and a column of read data channel 45 to represent a conflict between these two channels. The illustrated level-3 coverage table 33 has also been produced from information in the coverage table database 86, in which a mark 33a (black circle) is placed at a cell that represents a data type of "INCR/8 BYTES/4 TRANSFERS."

The above marks 31A, 32A, and 33A indicate a particular conflict condition that has been tested. The level-1 to level-3 coverage tables 31 to 33 thus make it possible for the design engineer to see which conflict conditions are covered by the verification test. There may be several variations in the way of placing such marks 31A, 32A, and 33A. The following section will describe a specific example of a marking method.

Figure 25:
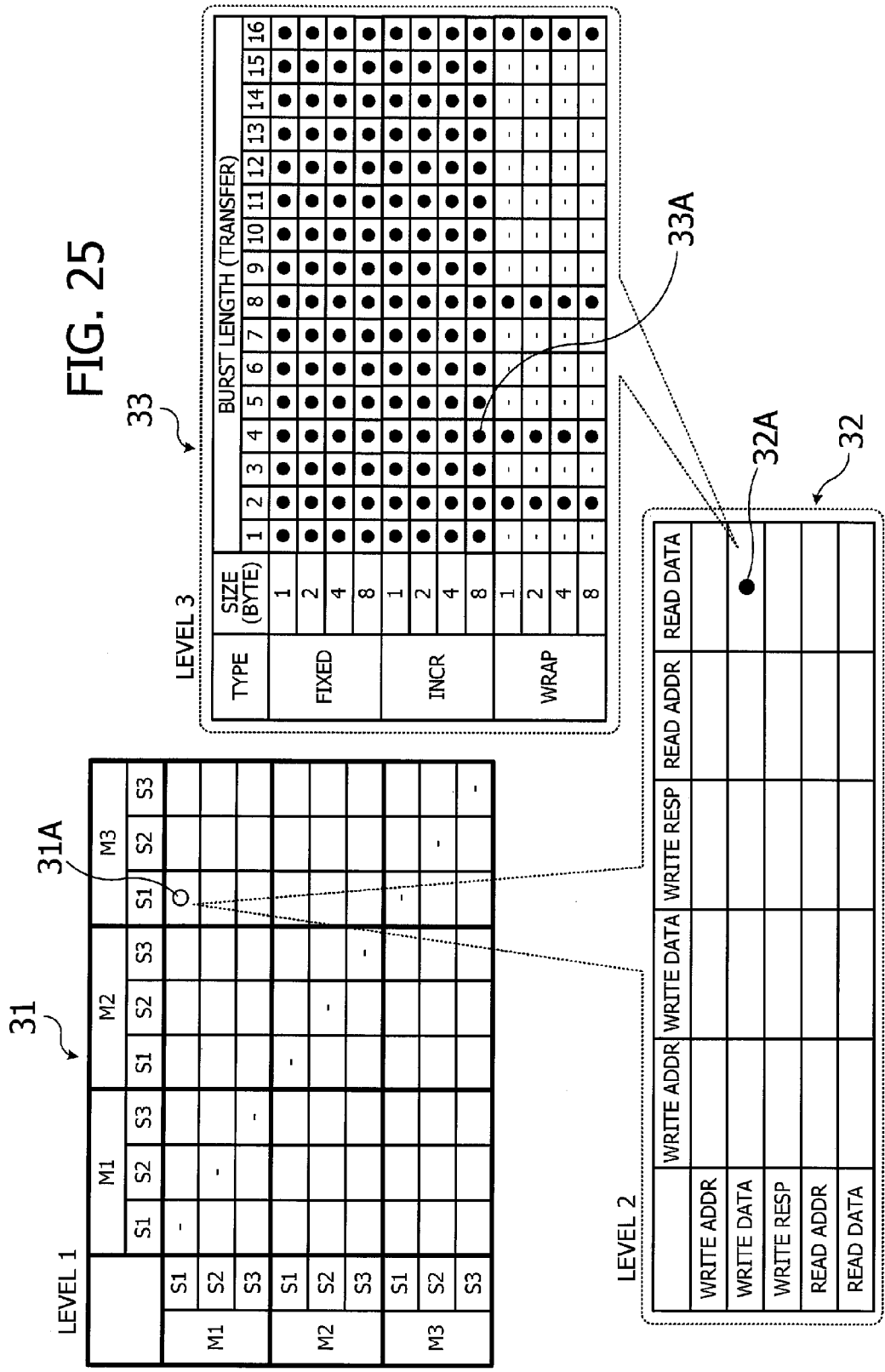

For example, a black circle is used as the mark 33A for level-3 coverage tables 33 as exemplified in FIG. 24. For level-2 coverage tables 32, a white circle is used as the mark 32A as illustrated in FIG. 24 until its corresponding level-3 coverage table 33 is fully populated with black circles. If every applicable cell in this lower-level coverage table 33 contains a black circle, it means that every possible data type has been tested. The white circle of the mark 32A is then replaced with a black circle to indicate the complete coverage of data types. FIG. 25 depicts this change in the mark 32A in the level-2 coverage table 32.

Figure 26:
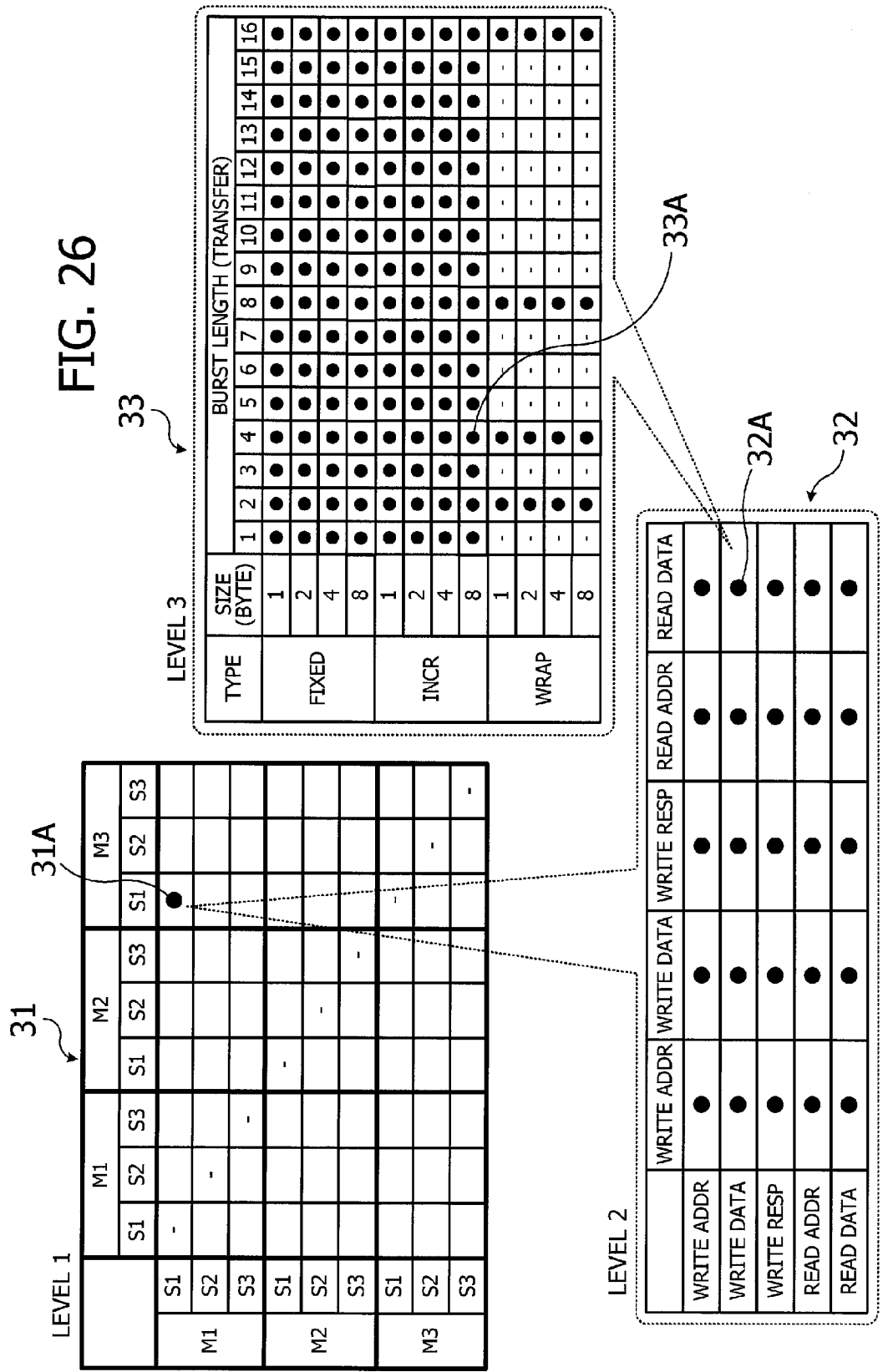

Similarly, a white circle is used as the mark 31A in the level-1 coverage table 31 as illustrated in FIG. 24 until its corresponding level-2 coverage table 32 is fully populated with black circles. If every cell of this lower-level coverage table 32 contains a black circle, it means that every possible combination of channels has been tested. The white circle of the mark 31A is then replaced with a black circle to indicate the complete coverage of channel combinations. FIG. 26 depicts this change in the mark 31A in the level-1 coverage table 31.

Figure 27:
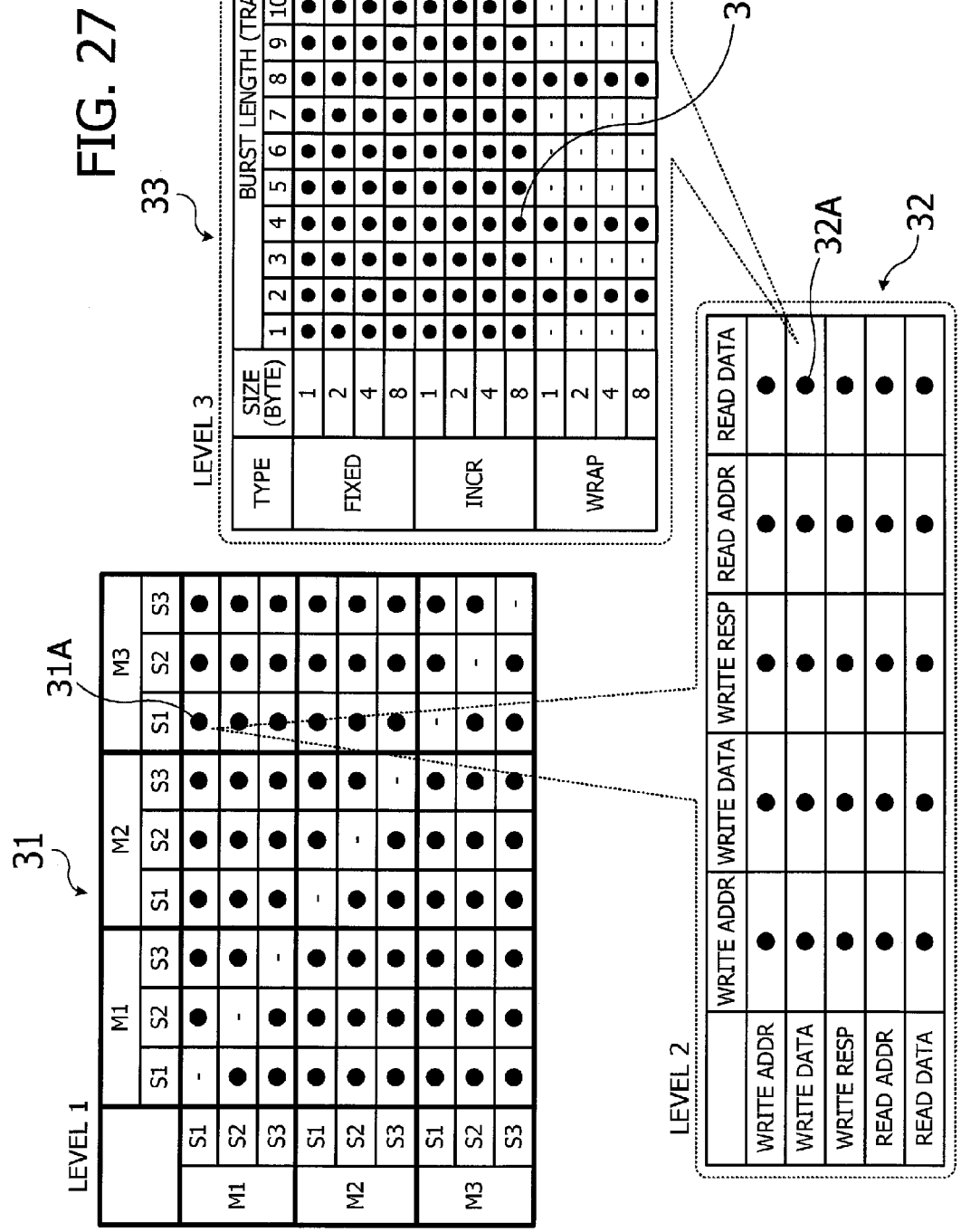

The marks 31A, 32A, and 33A are placed in the way described above, so that the resulting level-1 to level-3 coverage tables 31 to 33 indicate how thoroughly the conflict-causing scenarios 72 have tested the DUT 10 in terms of conflict conditions. In other words, the noted features of these coverage tables 31 to 33 make it possible to evaluate the coverage of conflict verification, with respect to all possible conflicts that the DUT 10 may encounter. Ideally, the level-1 coverage table 31 will finally be filled with black circles as seen in FIG. 27. These black circles indicate that the DUT 10 has been tested with all possible conflict conditions.

As can be seen from the above examples, the DUT 10 is thoroughly tested in terms of conflict verification, by using various scenarios 72 that provide a multitude of combinations of data types, concurrently-activated channels, combinations of master and slave units 12 and 13, timing of signals, and other parameters. The verification apparatus 60 accumulates various data in the coverage table database 86 of the recording unit 80 to generate and output coverage tables 31 to 33. The verification apparatus 60 is configured to display the above-described coverage tables 31 to 33 of FIGS. 24 to 27 on a screen of the monitor 104a attached thereto. These coverage tables 31 to 33 may be displayed individually or in combination.

The above description of the proposed conflict verification method in FIG. 13 has focused on one particular combination of channels i.e., M1-S1 write data channel 42 and M3-S1 read data channel 45, conflicting as in FIGS. 22 and 23. Since the DUT 10 may actually have a plurality of conflict-suspected channels and conflict-causing channels against each conflict-suffering channel, their corresponding cells in the level-1 to level-3 coverage tables 31 to 33 have to be populated with the marks 31A, 32A, and 33A. The proposed method thus produces such information for the coverage table database 86. Alternatively, the conflict verification method may be modified to add information to the coverage table database 86 when the channel of interest has only one conflict-suspected channel or conflict-causing channel, but produces no information for the coverage table database 86 when there are two or more conflict-suspected channels and conflict-causing channels. As another alternative, the conflict-causing scenarios 72 may previously be arranged not to produce multiple conflict-suspected channels or conflict-causing channels.

The above-described conflict verification method has also assumed that the DUT 10 includes a bus 11 based on the AXI protocol. The proposed conflict verification method is, however, not limited by that specific implementation. For example, the DUT 10 may use other bus protocols in its bus 11, such as the Advanced High-performance Bus (AHB) or Advanced Peripheral Bus (APB). The proposed method similarly applies to such variations.

Figure 28:
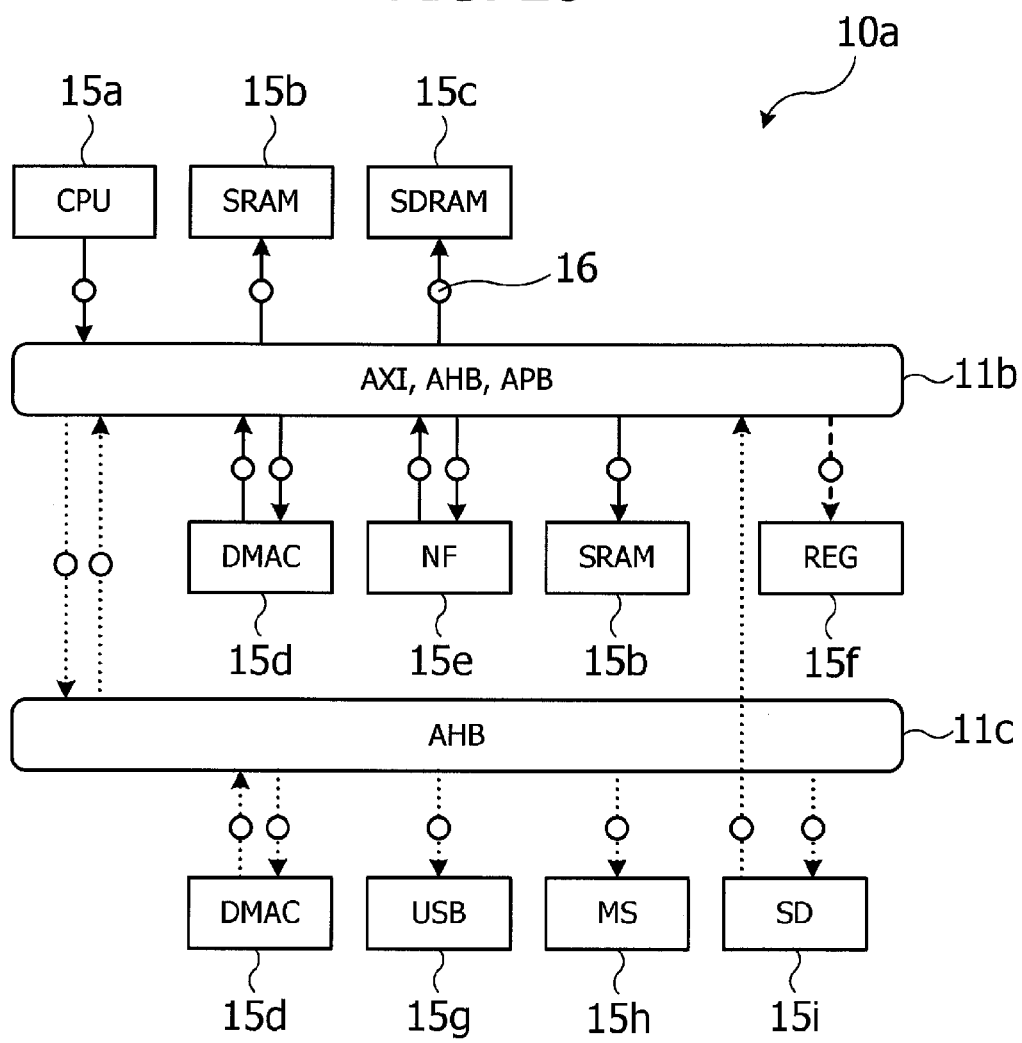
FIG. 28 illustrates a specific example of a DUT to which the proposed conflict verification method may be applied.

FIG. 28 illustrates a specific example of a DUT to which the proposed conflict verification method may be applied. The illustrated DUT 10a of FIG. 28 may be combined with the foregoing conflict monitor 50, so that a conflict verification test is executed in the above-described way.

More specifically, the DUT 10a includes two buses 11b and 11c. One bus 11b uses the AXI, AHB, and APB protocols, while the other bus 11b uses the AHB protocol. What are connected by these buses 11b and 11c are: CPU 15a, SRAM 15b, SDRAM 15c, DMAC 15d, NF 15e, register (REG) 15f, Universal Serial Bus (USB) interface 15g, Memory Stick (MS) 15h, and Secure Digital (SD) memory card 15i.

The arrows drawn between these components and the buses 11b and 11c in FIG. 28 represent the direction of signals transferred from master units to slave units. More specifically, the solid arrows represent the direction of signals transferred via AXI, the dotted arrows represent that via AHB, and the broken-line arrows represent that via APB. The foregoing conflict monitor 50 (not depicted) is attached to the DUT 10a to monitor transferred signals at some midpoint 16 of each path between the buses 11b and 11c and the above components. The conflict verification method discussed above for an AXI-based DUT is applied in this way to the DUT 10a using multiple protocols (i.e., AXI, AHB, APB).

As can be seen from the above explanation, the proposed conflict verification method is to capture a busy period of each signal transfer between master units and slave units and detect a conflict when an observed busy period is longer than the shortest busy period. This feature enables more accurate verification of conflict in the DUT.

The proposed conflict verification method also produces coverage tables, or a database equivalent to them, from information about combinations of master and slave units whose conflict has been tested. This feature makes it possible to see how thoroughly the verification test covers possible conflict conditions. In addition to the master-slave combinations, the proposed method collects information indicating combinations of conflicting channels and the type of data transferred by such channels. This information is incorporated into the coverage tables or their database, thus providing more detailed information.

The coverage tables or their database provides a clear picture of how many conflict conditions have been produced and verified in the DUT, as well as which part of the DUT has been tested. The proposed conflict verification test method makes an exhaustive conflict verification possible, while avoiding duplicated tests or missing tests. The coverage tables or their database indicates to what extent the verification scenarios have produced conflict conditions, thus enabling evaluation of their test coverage. The proposed conflict verification method contributes to improved accuracy of conflict verification, shortened test time, and reduced verification costs.

The proposed conflict verification method uses a conflict monitor to observe each channel connecting a bus with master and slave units in the DUT, so that a conflict verification process is performed on the basis of busy periods of those channels. The method is therefore applicable to various bus structures that DUTs may take. With the proposed conflict monitor, it may even be possible to test a DUT with an unknown bus structure.

The proposed verification apparatus and method and their variations have been described above. According to one aspect of these embodiments, the disclosed techniques contribute to sufficient verification of possible conflicts in a DUT, proper evaluation of test coverage, avoidance of duplicated or missing tests, improved accuracy of verification, shortened test times, and reduced verification costs.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A computer-readable storage medium storing a program for verification, the program causing a computer to perform a procedure comprising:
   obtaining a first transfer period of a first signal transferred between a first master unit and a first slave unit, the first master unit being among a plurality of master units included in a device to be tested, the first slave unit being among a plurality of slave units included in the device to be tested, the plurality of master units and the plurality of slave units being connected to a bus included in the device to be tested;

producing second combination information indicating a combination of a second master unit and a second slave unit, the second master unit being among the plurality of master units, the second slave unit being among the plurality of slave units, a second signal being transferred between the second master unit and the second slave unit during a second transfer period that overlaps at least a part of the first transfer period;

comparing the first transfer period with a third transfer period in terms of time length;

storing first combination information indicating a combination of the first master unit and the first slave unit in conjunction with the produced second combination information in a storage unit when the first transfer period is longer than the third transfer period;

assigning a new combination of master and slave units among the plurality of master units and slave units as the first master unit and the first slave unit; and performing the obtaining the first transfer period, the producing the second combination information, the comparing the first transfer period with the third transfer period, and the storing the first combination information in conjunction with the second combination information, by using the assigned new combination of master and slave units.

2. The computer-readable storage medium according to claim 1, wherein the third transfer period is a shortest transfer period of the first signal.

3. The computer-readable storage medium according to claim 1, wherein the procedure comprises storing first channel information indicating a channel that delivers the first signal in the storage unit, in conjunction with second channel information indicating a channel that delivers the second signal.

4. The computer-readable storage medium according to claim 3, wherein the procedure comprises storing, in the storage unit, information indicating what type of data the first signal carries.

5. The computer-readable storage medium according to claim 1, wherein the obtaining the first transfer period, the producing the second combination information, the comparing the first transfer period with the third transfer period, and the storing the first combination information in conjunction with the second combination information are performed for each of a plurality of the first signals, the plurality of the first signals being of different types.

6. The computer-readable storage medium according to claim 1, wherein:

the producing the second combination information includes producing the second combination information with respect to each of combinations of the master units and the slave units other than the combination of the first master unit and the first slave unit among the plurality of master units and slave units; and the comparing the first transfer period with the third transfer period and the storing the first combination information in conjunction with the second combination information are performed for said each of the combinations of master and slave units.

7. The computer-readable storage medium according to claim 1, wherein the obtaining the first transfer period and the producing the second combination information are performed by making the device to be tested perform in accordance with a scenario that makes combinations of the master units and the slave units operate to achieve specific functions.

8. The computer-readable storage medium according to claim 1, wherein the procedure comprises obtaining the third transfer period, prior to the obtaining the first transfer period, by making the device to be tested perform in accordance with a scenario that makes only the combination of the first master unit and the first slave unit among combinations of the plurality of master units and slave units operate separately.

9. A verification method comprising:

obtaining, by a processor, a first transfer period of a first signal transferred between a first master unit and a first slave unit, the first master unit being among a plurality of master units included in a device to be tested, the first slave unit being among a plurality of slave units included in the device to be tested, the plurality of master units and the plurality of slave units being connected to a bus included in the device to be tested;

producing, by the processor, second combination information indicating a combination of a second master unit and a second slave unit, the second master unit being among the plurality of master units, the second slave unit being among the plurality of slave units, a second signal being transferred between the second master unit and the second slave unit during a second transfer period that overlaps at least a part of the first transfer period;

comparing, by the processor, the first transfer period with a given third transfer period in terms of time length;

storing, by the processor, first combination information indicating a combination of the first master unit and the first slave unit in conjunction with the produced second combination information in a storage unit when the first transfer period is longer than the third transfer period;

assigning, by the processor, a new combination of master and slave units among the plurality of master units and slave units as the first master unit and the first slave unit; and performing, by the processor, the obtaining the first transfer period, the producing the second combination information, the comparing the first transfer period with the third transfer period, and the storing the first combination information in conjunction with the second combination information, by using the assigned new combination of master and slave units.

10. The verification method according to claim 9 wherein the third transfer period is a shortest transfer period of the first signal.

11. The verification method according to claim 9, further comprising storing, by the processor, first channel information indicating a channel that delivers the first signal in the storage unit, in conjunction with second channel information indicating a channel that delivers the second signal.

12. The verification method according to claim 11, further comprising storing, by the processor, in the storage unit, information indicating what type of data the first signal carries.

13. The verification method according to claim 9 wherein the obtaining the first transfer period, the producing the second combination information, the comparing the first transfer period with the third transfer period, and the storing the first combination information in conjunction with the second combination information are performed for each of a plurality of the first signals, the plurality of the first signals being of different types.

14. The verification method according to claim 9 wherein:
the producing the second combination information includes producing the second combination information with respect to each of combinations of the master units and the slave units other than the combination of the first master unit and the first slave unit among the plurality of master units and slave units; and
the comparing the first transfer period with the third transfer period and the storing the first combination information in conjunction with the second combination information are performed for said each of the combinations of master and slave units.

15. The verification method according to claim 9 wherein the obtaining the first transfer period and the producing the second combination information are performed by making the device to be tested perform in accordance with a scenario that makes combinations of the master units and the slave units operate to achieve specific functions.

16. The verification method according to claim 9, further comprising obtaining, by the processor and prior to the obtaining of the first transfer period, the third transfer period by making the device to be tested perform in accordance with a scenario that makes only the combination of the first master unit and the first slave unit among combinations of the plurality of master units and slave units operate separately.

17. A verification apparatus comprising:
a storage unit; and
a processor configured to perform a procedure including:
obtaining a first transfer period of a first signal transferred between a first master unit and a first slave unit, the first master unit being among a plurality of master units included in a device to be tested, the first slave unit being among a plurality of slave units included in the device to be tested, the plurality of master units and the plurality of slave units being connected to a bus included in the device to be tested;
producing second combination information indicating a combination of a second master unit and a second slave unit, the second master unit being among the plurality of master units, the second slave unit being among the plurality of slave units, a second signal being transferred between the second master unit and the second slave unit during a second transfer period that overlaps at least a part of the first transfer period;
comparing the first transfer period with a third transfer period in terms of time length;
storing first combination information indicating a combination of the first master unit and the first slave unit in conjunction with the produced second combination information in a storage unit when the first transfer period is longer than the third transfer period;
assigning a new combination of master and slave units among the plurality of master units and slave units as the first master unit and the first slave unit; and
performing the obtaining the first transfer period, the producing the second combination information, the comparing the first transfer period with the third transfer period, and the storing the first combination information in conjunction with the second combination information, by using the assigned new combination of master and slave units.

* * * * *